(12) United States Patent
Susong et al.

(10) Patent No.: US 11,951,543 B2
(45) Date of Patent: Apr. 9, 2024

(54) ADDITIVE MANUFACTURING MACHINE AND METHOD WITH VARIABLE POWDER DISPENSING ASSEMBLY

(71) Applicant: General Electric Company, Schenectady, NY (US)

(72) Inventors: Adam Garret Susong, Loveland, OH (US); Ryan William Van Deest, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 17/364,119

(22) Filed: Jun. 30, 2021

(65) Prior Publication Data

US 2023/0001484 A1 Jan. 5, 2023

(51) Int. Cl.
*B65D 83/06* (2006.01)
*A47G 19/24* (2006.01)
(Continued)

(52) U.S. Cl.
CPC .............. *B22F 10/28* (2021.01); *A47G 19/24* (2013.01); *B22F 10/30* (2021.01); *B22F 10/85* (2021.01); *B22F 12/222* (2021.01); *B22F 12/224* (2021.01); *B22F 12/30* (2021.01); *B22F 12/38* (2021.01); *B22F 12/50* (2021.01);
(Continued)

(58) Field of Classification Search
CPC ...... B65D 83/04; B65D 83/06; B65D 47/263; B65D 47/265; B65D 47/283; B22F 10/28; B22F 12/222; B22F 12/224; B22F 12/30; B22F 12/38; B22F 12/52; B22F 12/53; B22F 12/57; B22F 2999/00; B22F 10/30; B22F 10/85; B22F 12/50; B22F 12/90; Y02P 10/25
See application file for complete search history.

(56) References Cited

U.S. PATENT DOCUMENTS 2,389,683 A * 11/1945 Page ................... B65D 47/265
141/370
2,670,103 A 2/1954 La Mers et al.
(Continued)

FOREIGN PATENT DOCUMENTS

CN 202239627 U 5/2012
CN 102009180 B 7/2012
(Continued)

*Primary Examiner* — Frederick C Nicolas
(74) *Attorney, Agent, or Firm* — Dority & Manning, P.A.

(57) ABSTRACT

A powder dispensing assembly for an additive manufacturing machine is provided. The powder dispensing assembly includes a housing that defines a powder reservoir that receives additive powder; a first plate removably connectable to the housing, the first plate defining a first discharge orifice having a first discharge orifice geometry; and a second plate removably connectable to the housing, the second plate defining a second discharge orifice having a second discharge orifice geometry different than the first discharge orifice geometry, wherein with the first plate connected to the housing, the additive powder flows out of the first discharge orifice at a first dosing rate, and wherein with the second plate connected to the housing, the additive powder flows out of the second discharge orifice at a second dosing rate different than the first dosing rate.

16 Claims, 13 Drawing Sheets

(51) Int. Cl.
    *B22F 10/28*     (2021.01)
    *B22F 10/30*     (2021.01)
    *B22F 10/85*     (2021.01)
    *B22F 12/00*     (2021.01)
    *B22F 12/30*     (2021.01)
    *B22F 12/50*     (2021.01)
    *B22F 12/52*     (2021.01)
    *B22F 12/53*     (2021.01)
    *B22F 12/57*     (2021.01)
    *B22F 12/90*     (2021.01)
    *B33Y 30/00*     (2015.01)
    *B65D 83/04*     (2006.01)
    *B65D 47/26*     (2006.01)
    *B65D 47/28*     (2006.01)

(52) U.S. Cl.
    CPC .............. *B22F 12/52* (2021.01); *B22F 12/53* (2021.01); *B22F 12/57* (2021.01); *B22F 12/90* (2021.01); *B33Y 30/00* (2014.12); *B65D 83/04* (2013.01); *B65D 83/06* (2013.01); *B22F 2999/00* (2013.01); *B65D 47/263* (2013.01); *B65D 47/265* (2013.01); *B65D 47/283* (2013.01); *Y02P 10/25* (2015.11)

(56) References Cited

U.S. PATENT DOCUMENTS

| | | | | |
|---|---|---|---|---|
| 3,814,002 | A | 6/1974 | Rombach et al. | |
| 4,606,893 | A * | 8/1986 | Sangster | B01F 21/22 222/23 |
| 4,653,672 | A * | 3/1987 | Tuerk | B65D 47/263 222/548 |
| 4,699,299 | A * | 10/1987 | Gach | B65D 47/265 222/480 |
| 4,850,515 | A * | 7/1989 | Cleland | B67D 1/0004 222/164 |
| 4,961,521 | A * | 10/1990 | Eckman | A47G 19/24 222/545 |
| 5,027,981 | A * | 7/1991 | Magister | B65D 81/325 222/137 |
| 5,111,976 | A * | 5/1992 | Ban | G03G 15/087 222/DIG. 1 |
| 5,213,238 | A * | 5/1993 | Martin | B65D 47/265 222/548 |
| 5,513,776 | A * | 5/1996 | Canini | A47G 19/24 222/548 |
| 6,145,705 | A * | 11/2000 | Wallace | A47G 19/34 222/164 |
| 6,223,953 | B1 | 5/2001 | Arslanouk et al. | |
| 7,045,738 | B1 | 5/2006 | Kovacevic et al. | |
| 7,513,399 | B2 * | 4/2009 | Mengeu | B65D 47/265 222/575 |
| 7,980,923 | B2 | 7/2011 | Olmo et al. | |
| 8,505,760 | B2 * | 8/2013 | Ott | B65D 5/748 222/541.6 |
| 9,371,164 | B2 * | 6/2016 | Cavalier | B65D 47/265 |
| 11,065,815 | B2 * | 7/2021 | Van Deest | B22F 12/67 |
| 11,285,083 | B1 * | 3/2022 | Karpman | A61J 1/00 |
| 2002/0105114 | A1 * | 8/2002 | Kubo | B29C 64/153 425/375 |
| 2008/0283537 | A1 * | 11/2008 | Smith | A47G 19/2272 222/145.5 |
| 2009/0285955 | A1 * | 11/2009 | Crow | A47J 31/401 222/1 |
| 2010/0276441 | A1 * | 11/2010 | Pordy | A47G 19/24 222/565 |
| 2011/0287185 | A1 * | 11/2011 | Felstead | B22F 3/105 118/58 |
| 2014/0076937 | A1 * | 3/2014 | Cavalier | B65D 47/265 222/548 |
| 2017/0021452 | A1 * | 1/2017 | Tanaka | B23K 15/0086 |
| 2019/0217385 | A1 | 7/2019 | Bonilla Gonzalez et al. | |
| 2020/0189191 | A1 | 6/2020 | Van Deest et al. | |
| 2023/0001642 | A1 * | 1/2023 | Susong | B29C 64/393 |

FOREIGN PATENT DOCUMENTS

| | | |
|---|---|---|
| EP | 2193758 A1 | 6/2010 |
| EP | 3511094 A1 | 7/2019 |
| FR | 3083473 A1 | 1/2020 |

* cited by examiner

ADDITIVE MANUFACTURING MACHINE AND METHOD WITH VARIABLE POWDER DISPENSING ASSEMBLY

FIELD

The present disclosure generally pertains to additive manufacturing machines and systems, including build units for large format additive manufacturing operations and/or variable powder dispensing assemblies.

BACKGROUND

Large format additive manufacturing systems or machines may include a build unit and a build vessel, in which a cross-sectional surface area of the build vessel significantly exceeds the cross-sectional surface area of the build unit. The build unit and/or the build vessel may be movable relative to one another to additively manufacture relatively large objects and/or a relatively large quantity of objects within the build vessel.

Additive manufacturing operations with inconsistent dosing, e.g., underdosing or overdosing conditions, could result in failed builds and/or increased costs. Accordingly, improved additive manufacturing systems and machines, including improved dosing, would be welcomed in the art.

BRIEF DESCRIPTION

Aspects and advantages will be set forth in part in the following description, or may be apparent from the description, or may be learned through practicing the presently disposed subject matter.

In one exemplary embodiment of the present disclosure, a powder dispensing assembly for an additive manufacturing machine is provided. The powder dispensing assembly includes a housing that defines a powder reservoir that receives additive powder; a first plate removably connectable to the housing, the first plate defining a first discharge orifice having a first discharge orifice geometry; and a second plate removably connectable to the housing, the second plate defining a second discharge orifice having a second discharge orifice geometry different than the first discharge orifice geometry, wherein with the first plate connected to the housing, the additive powder flows out of the first discharge orifice at a first dosing rate, and wherein with the second plate connected to the housing, the additive powder flows out of the second discharge orifice at a second dosing rate different than the first dosing rate.

In another exemplary embodiment of the present disclosure, a powder dispensing assembly for an additive manufacturing machine is provided. The powder dispensing assembly includes a housing that defines a powder reservoir that receives additive powder; and a first plate removably connected to the housing, the first plate defining a first discharge orifice having a first discharge orifice geometry and a second discharge orifice having a second discharge orifice geometry different than the first discharge orifice geometry, wherein the additive powder flows out of the first discharge orifice at a first dosing rate and the additive powder flows out of the second discharge orifice at a second dosing rate different than the first dosing rate.

In an exemplary aspect of the present disclosure, a method is provided for additively manufacturing a three-dimensional object on a work surface including a powder dispensing assembly having a housing. The method includes depositing a first layer of additive powder over a portion of the work surface at a first dosing rate; removing a first plate from the housing, the first plate defining a first discharge orifice having a first discharge orifice geometry; and connecting a second plate to the housing, the second plate defining a second discharge orifice having a second discharge orifice geometry different than the first discharge orifice geometry.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disposed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1A:
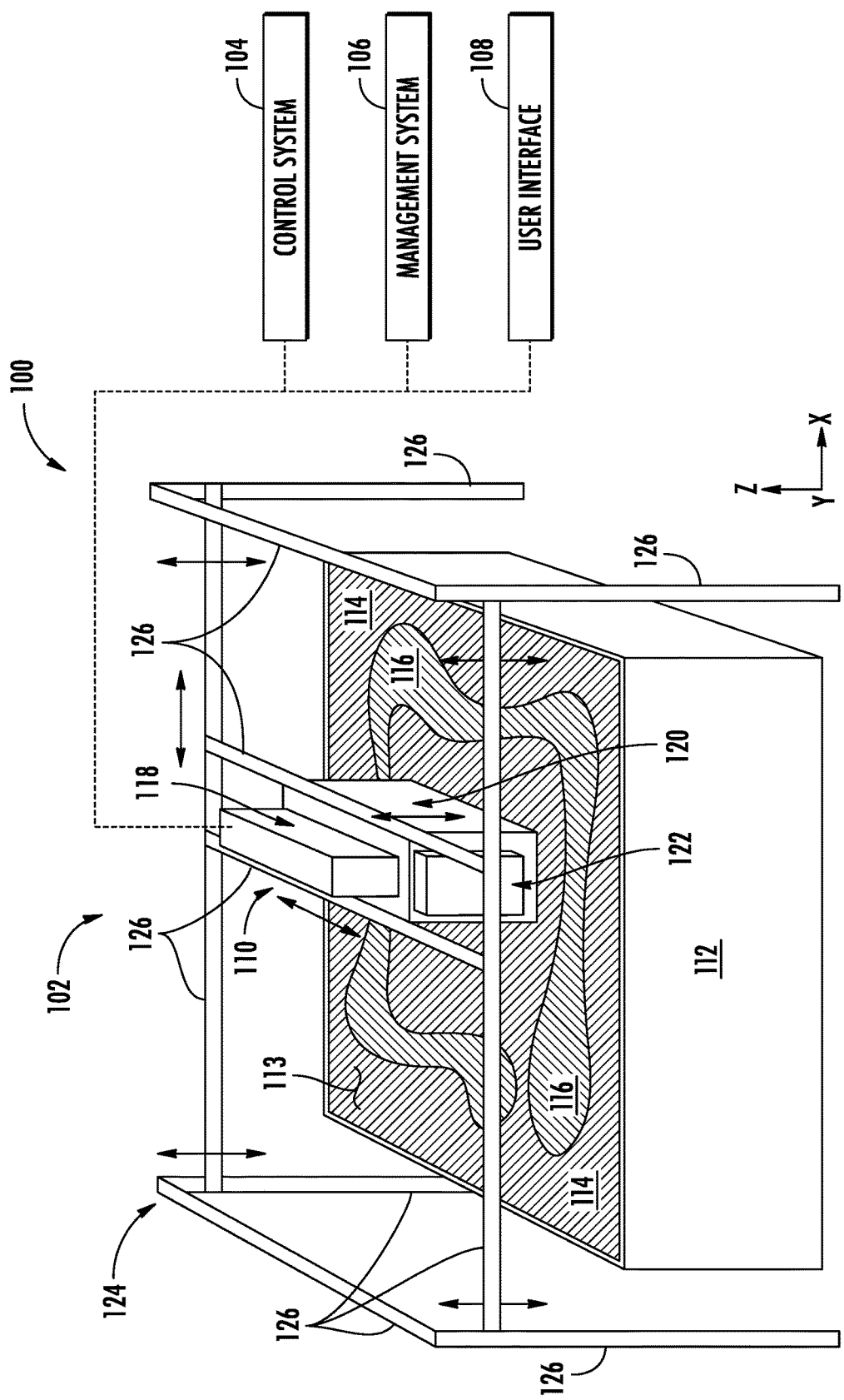
FIGS. 1A and 1B schematically depict exemplary additive manufacturing systems in accordance with an exemplary embodiment of the present disclosure.

The presently disclosed subject matter will now be described in further detail, in some instances with reference to one or more of the drawings. Examples are provided by way of explanation and should not be interpreted as limiting the present disclosure. In fact, it will be apparent to those skilled in the art that various modifications and variations can be made in the present disclosure without departing from the scope of the present disclosure. For instance, features illustrated or described in one portion of the present disclosure can be used with features illustrated or described in another portion of the present disclosure, including with modification and variations thereof. It is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disposed herein are inclusive of the endpoints, and the endpoints are independently combinable with each other.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. As used herein, the term "object" refers to any layer-by-layer additively manufactured product such as components, pieces, parts, builds, or any other type of similarly named object. Additively manufactured objects are generally monolithic in nature, and may have a variety of integral sub-components.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

Additionally or alternatively suitable additive manufacturing technologies include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Sterolithography (SLA) technology, and other additive manufacturing technology that utilizes an energy beam.

Additive manufacturing technology may generally be described as fabrication of objects by building objects point-by-point, layer-by-layer, typically in a vertical direction; however, other methods of fabrication are contemplated and within the scope of the present disclosure. For example, although the discussion herein refers to the addition of material to form successive layers, the presently disposed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 µm and 200 µm, although the thickness may be selected based on any number of parameters and may be any suitable size.

The present disclosure generally pertains to build units for additive manufacturing systems or machines. The presently disclosed build units may be utilized with large format additive manufacturing systems or machines that include a build unit and a build vessel, for example, in which a cross-sectional surface area of the build vessel may significantly exceed the cross-sectional surface area of the build unit. The build unit and/or the build vessel may be movable relative to one another to additively manufacture relatively large objects and/or a relatively large quantity of objects within the build vessel.

An additive manufacturing machine of the present disclosure can include a dosing rate measurement device that is in communication with a portion of a powder dispenser assembly. The dosing rate measurement device measures a dosing rate of the additive powder in-situ. As used herein, "in-situ" is intended to refer to the dosing rate measurement device being able to measure a dosing rate of the additive powder while the additive manufacturing machine is operating. In-situ measurement of a dosing rate of the additive powder of the present disclosure allows for monitoring of how a dosing rate is changing during operation of an additive manufacturing machine and reduces the instances of underdosing and overdosing.

Figure 1B:
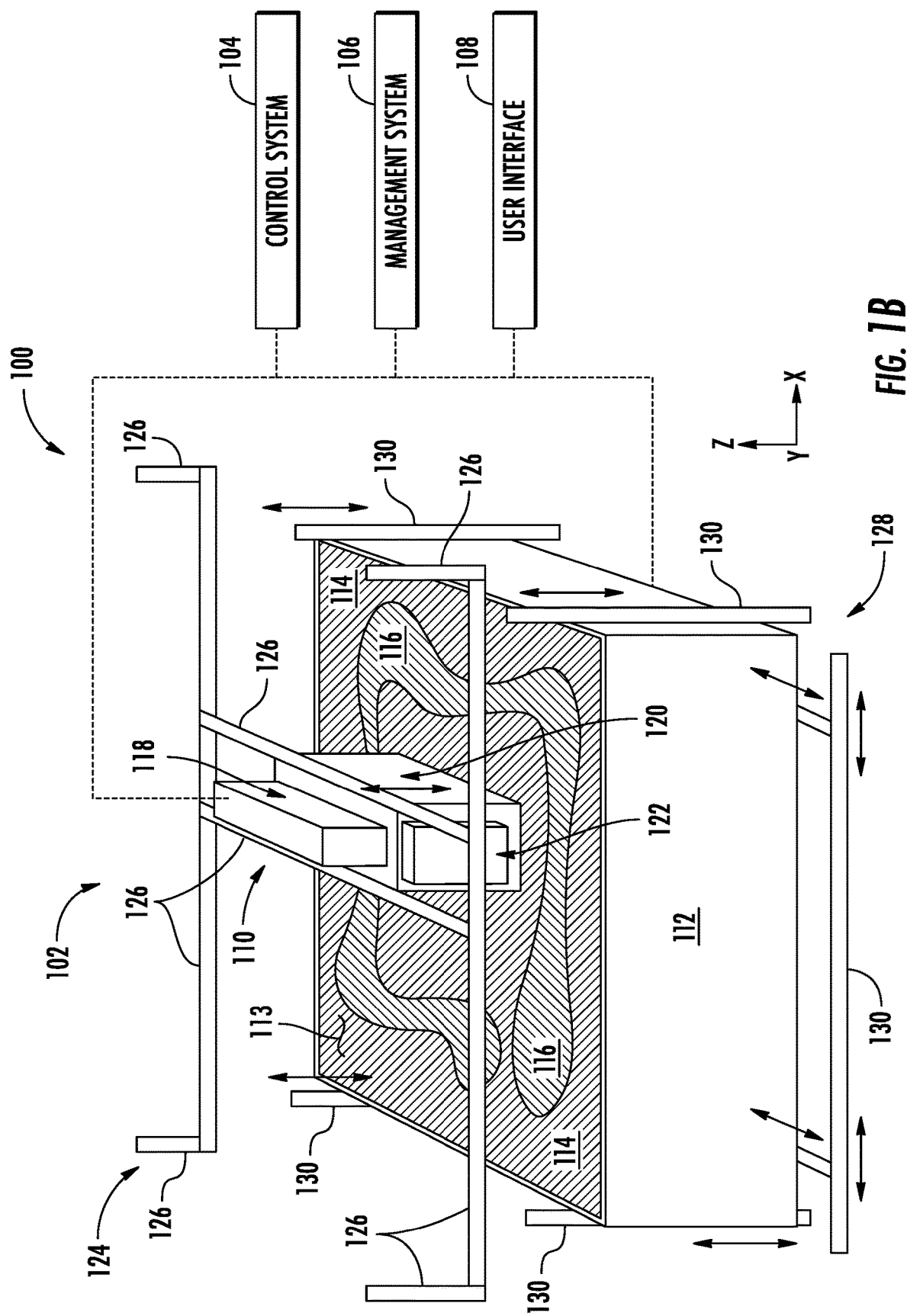

The presently disclosed subject matter will now be described in further detail. FIGS. 1A and 1B schematically depict exemplary embodiments of an additive manufacturing system 100. The additive manufacturing system 100 may include one or more additive manufacturing machines 102. The one or more additive manufacturing machines 102 may include a control system 104. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

An additive manufacturing machine 102 may include one or more build units 110. Additionally, or in the alternative, an additive manufacturing machine 102 may include a build vessel 112 defining a work surface 113. The one or more build units 110 may be configured to supply powder material 114 to the build vessel 112. Additionally, or in the alternative, the one or more build units 110 may be configured to selectively solidify the powder material 114 to additively manufacture a three-dimensional object 116. As shown in FIGS. 1A and 1B, an exemplary build unit 110 may include an energy beam system 118, an irradiation chamber 120, and a powder module 122. The energy beam system 118 and the irradiation chamber 120 may be operably coupled to one another. An irradiation chamber 120 and a powder module 122 may be operably coupled to one another. Additionally, or in the alternative, an irradiation chamber 120 and a powder module 122 may be provides as separate build units 110.

The additive manufacturing system 100 or additive manufacturing machine 102 may be configured for large format additive manufacturing. For example, a build vessel 112 and/or one or more objects 116 additively manufactured therein may have a cross-sectional area that exceeds the cross-sectional area of the one or more build units 110 utilized to additively manufacture the one or more objects 116. The one or more build units 110 and/or the build vessel 112 may be movable relative to perform large-format additive manufacturing operations.

As shown in FIG. 1A, the one or more build units 110 may be operably coupled to a build unit-positioning system 124. The build unit-positioning system 124 may be configured to move the one or more build units 110 to specified build coordinates and/or along specified build vectors corresponding to a three-dimensional cartesian coordinate system in accordance with control commands provided, for example, by the control system 104. The control commands may be provided, for example, to carry out operations of the one or more build units 110 in accordance with the present disclosure. The build unit-positioning system 124 may include one or more build unit-gantry elements 126 configured to movably support the one or more build units 110. Respective build unit-gantry elements 126 may be configured to move the one or more build units 110 in one or more directions, such as an X-direction, a Y-direction, and/or a Z-direction.

As shown in FIG. 1B, the one or more build vessels 112 may be operably coupled to a build vessel-positioning system 128. The build vessel-positioning system 128 may be configured to move the build vessel 112 to specified build coordinates and/or along specified build vectors corresponding to a three-dimensional cartesian coordinate system in accordance with control commands provided, for example, by the control system 104. The control commands may be provided, for example, to carry out operations of the one or more build units 110 in accordance with the present disclosure. The build vessel-positioning system 128 may include one or more build vessel-gantry elements 130 configured to movably support the build vessel 112. Respective build vessel-gantry elements 130 may be configured to move the build vessel 112 in one or more directions, such as an X-direction, a Y-direction, and/or a Z-direction.

The one or more build vessels 112 may be operably coupled to a build vessel-positioning system 128 in addition to, or in the alternative to, one or more build units 110 operably coupled to a build unit-positioning system 124. For example, an additive manufacturing machine 102 may include a build vessel-positioning system 128 and one or more stationary build units 110. Additionally, or in the alternative, an additive manufacturing machine 102 may include a build vessel-positioning system 128 and a build unit-positioning system 124. The build vessel-positioning system 128 may be configured to move a build vessel 112 in one or more directions, and the build vessel-positioning system 128 may be configured to move a build vessel 112 in one or more directions. For example, the build vessel-positioning system 128 may be configured to move a build vessel 112 in an X-direction and/or a Y-direction. Additionally, or in the alternative, the build unit-positioning system 124 may be configured to move a build unit 110 in a Z-direction.

A build vessel-positioning system 128 may be configured to move a build vessel 112 horizontally while one or more build units 110 selectively irradiate portions of the powder material 114 in the build vessel 112. For example, the build vessel-positioning system 128 may be configured to move a build vessel 112 in accordance with an X-Y coordinate system. Additionally, or in the alternative, a build unit-positioning system 124 may be configured to move a build unit 110 horizontally while the build unit 110 selectively irradiates portions of the powder material 114 in the build vessel 112. For example, the build vessel-positioning system 128 may be configured to move a build vessel 112 in accordance with an X-Y coordinate system. A vertical position of the one or more build units 110 and/or the build vessel 112 may be augmented in connection with the addition of sequential layers of powder material 114 to the build vessel 112 and selective irradiation of the respective layers of powder material 114 in the build vessel 112. The build vessel-positioning system 128 may be configured to sequentially move the build vessel 112 vertically to provide room for the next sequential layer of powder material 114 to be added to the build vessel 112. Additionally, or in the alternative, the build unit-positioning system 124 may be configured to sequentially move a build unit 110 vertically to provide room for the next sequential layer of powder material 114 to be added to the build vessel 112. Movements of the build unit 110 and/or the build vessel 112 may be carried out before, during, or after, irradiating a sequential layer of powder material 114.

Figure 2:
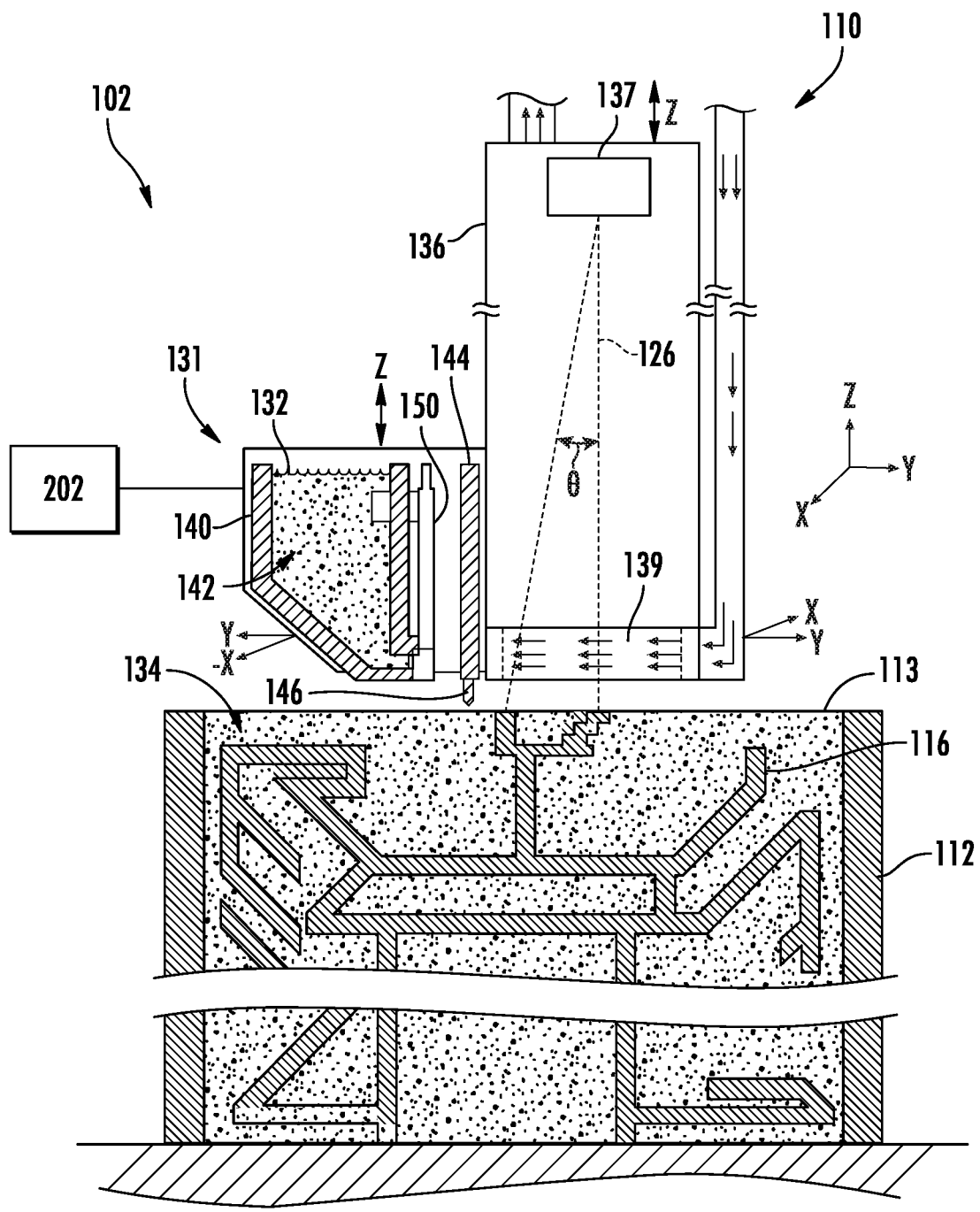
FIG. 2 is a side elevation view of a build unit and additive manufacturing system in accordance with an exemplary embodiment of the present disclosure.

Referring now to FIG. 2, build unit 110 of additive manufacturing machine 102 may further include a powder dispensing assembly 131 which is generally configured for selectively depositing additive powder 132 for facilitating the additive manufacturing process. In this regard, for example, powder dispensing assembly 131 may be configured for depositing a layer of additive powder 132 onto build vessel 112, or onto select locations of a powder bed 134 which is generally defined by portions of build vessel 112. Powder dispensing assembly 131 will be described herein according to an exemplary embodiment. However, it should be appreciated that variations and modifications to powder dispensing assembly 131 may be implemented and powder dispensing assembly 131 may be used with other additive manufacturing machines according to alternative embodiments.

As shown, build unit 110 may include an enclosure 136 which generally houses energy source 137 and defines a controlled environment and/or a gas flow zone 139 to facilitate and improve the sintering or melting process. According to an exemplary embodiment, powder dispensing assembly 131 is attached to enclosure 136 such that enclosure 136 and powder dispensing assembly 131 may be supported and moved together as a single build unit 110 by unit-positioning system 124, e.g., as described above. In this manner, as build unit 110 is moved across powder bed 134, powder dispensing assembly 131 may selectively deposit additive powder 132 at locations where object 116 will be formed and energy source 137 may selectively fuse the additive powder 132 to form object 116.

Figure 3:
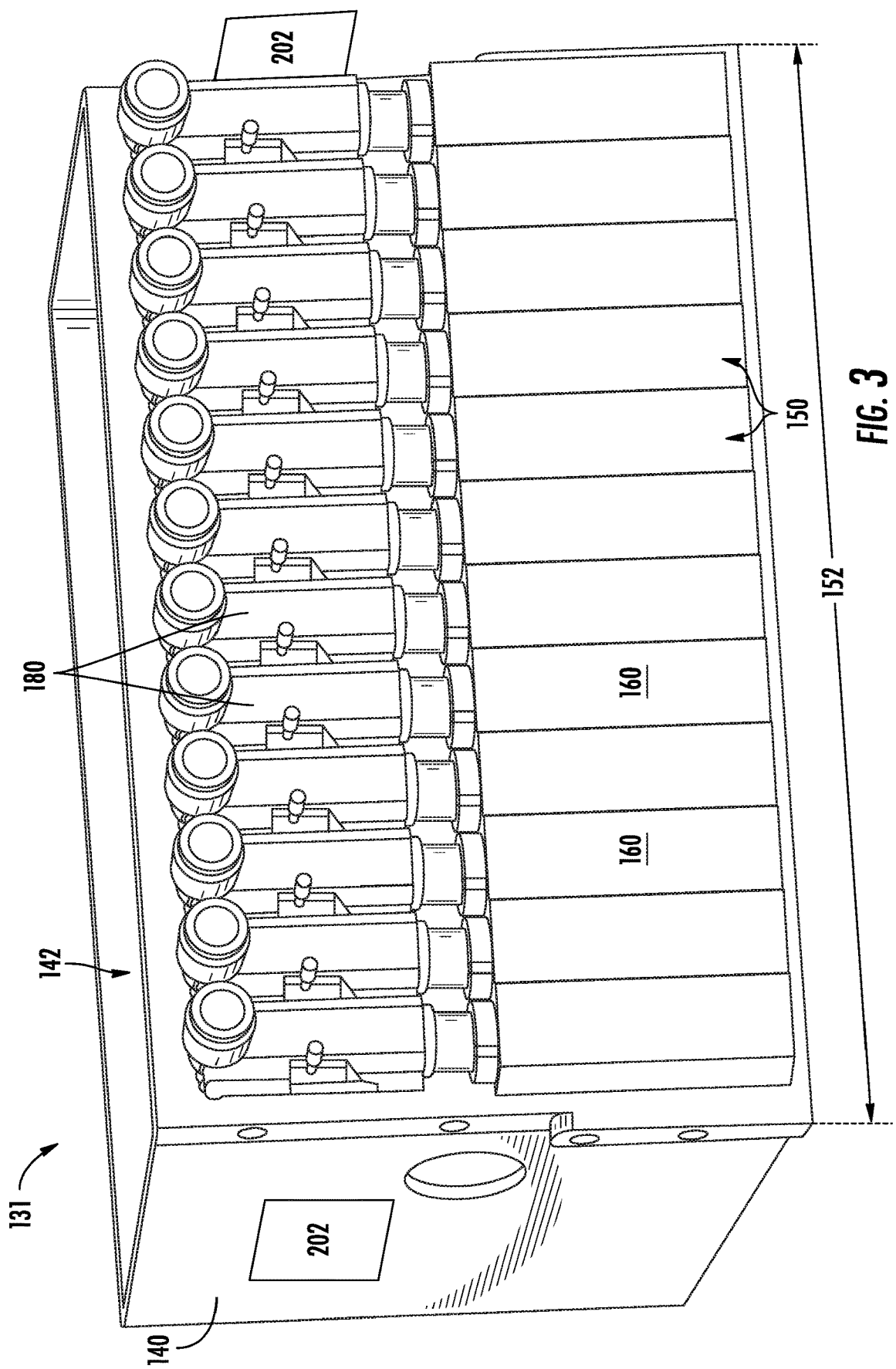
FIG. 3 is a perspective view of a powder dispensing assembly in accordance with an exemplary embodiment of the present disclosure.
Figure 4:
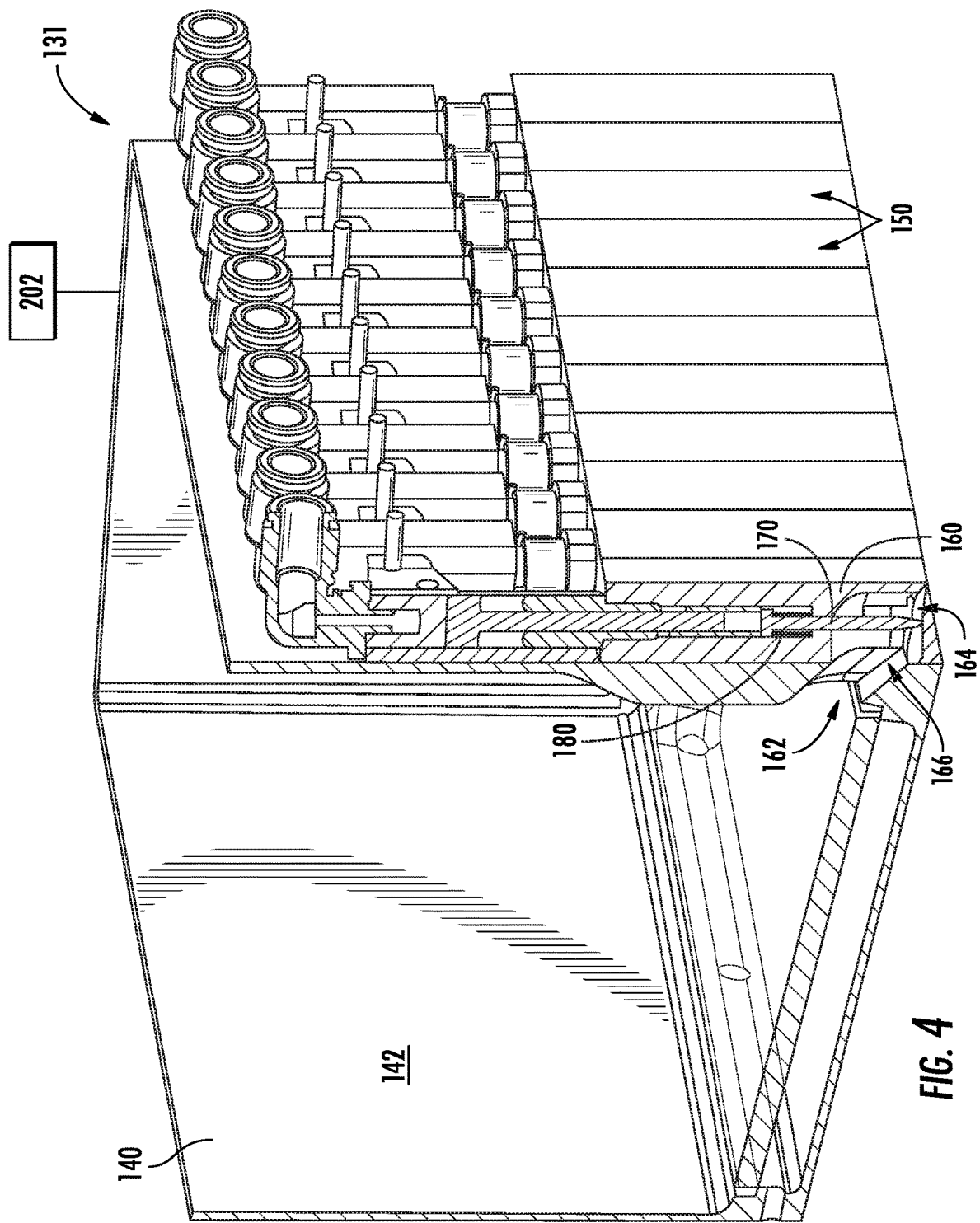
FIG. 4 is a perspective, cross-sectional view of a powder dispensing assembly in accordance with an exemplary embodiment of the present disclosure.

Referring now to FIGS. 2-4, in exemplary embodiments, powder dispensing assembly 131 may include a hopper 140 which includes a plurality of walls that generally define a powder reservoir 142 for receiving additive powder 132. In this regard, hopper 140 is generally sized for holding a sufficient volume of additive powder 132 to facilitate the uninterrupted printing of some or all of object 116. Intermittently throughout the printing process, build unit 110 may be moved by build-unit gantry elements 126 to a refill location where additional additive powder 132 may be supplied into powder reservoir 142. According to alternative embodiments, an additive powder supply system may be operably coupled with hopper 140 to continuously supply powder reservoir 142 with additive powder 132 throughout the printing process.

As best shown in FIG. 2, build unit 110 may further include a recoater arm 144 having a recoater blade 146 positioned at its bottom end for evening or smoothing out a layer of additive powder 132 as it is deposited onto powder bed 134 from powder reservoir 142. In this regard, recoater arm 144 may move along the vertical direction to provide the desired clearance between recoater blade 146 and powder bed 134. In this manner, recoater arm 144 and recoater blade 146 may scrape or thin the layer of additive powder 132 to achieve the desired cross-sectional layer thickness. In general, build unit 110 may have a downstream end which faces the direction toward which build unit 110 is moving and an upstream end from which build unit 110 has moved. Specifically, referring to FIG. 2, build unit 110 moves from right to left such that additive powder 132 is deposited on powder bed 134 before enclosure 136 passes over the deposited powder to perform a sintering or melting process.

Referring still to FIGS. 2-4, in exemplary embodiments, powder dispensing assembly 131 may further include a plurality of powder distribution modules 150 which are operably coupled with hopper 140 for selectively dispensing additive powder 132, as described in detail herein. In general, powder dispensing assembly 131 includes any suitable number of powder distribution modules 150 which may be stacked together and mounted to an upstream end of hopper 140 for regulating the flow of additive powder 132 selectively along a width 152 of hopper 140. For example, in certain circumstances it may be desirable to dispense more additive powder 132 at the edges of hopper 140 than from a center of hopper 140. The plurality of powder distribution modules 150 permits such selective dispensing along the width 152 of hopper 140. According still to other exemplary embodiments, powder distribution modules 150 may be selectively opened to dispense additive powder 132 only within regions of powder bed 134 where object 116 will be fused or formed. Exemplary powder distribution modules 150 will be described below, though it should be appreciated that variations and modifications may be made while remaining within the scope of the present subject matter.

In exemplary embodiments, each powder distribution module 150 generally includes a powder distribution portion or body 160 which may be mounted or otherwise positioned at an upstream end of hopper 140, e.g., over a hopper opening 162. In this regard, hopper opening 162 may be positioned proximate a bottom of hopper 140 for permitting additive powder 132 to flow out of powder reservoir 142. Powder distribution body 160 may define a discharge orifice 164 and a supply gate 166 that fluidly couples powder reservoir 142 to discharge orifice 164, e.g., via hopper opening 162. In this regard, supply gate 166 may be a passageway that extends between hopper opening 162 and discharge orifice 164 for directing additive powder while preventing clogs or promote even flow of additive powder 132. According to the illustrated embodiment, discharge orifice 164 is defined within a horizontal plane or faces downward along the vertical direction (e.g., the Z-direction) to permit additive powder 132 to fall or be deposited through discharge orifice 164 directly along the vertical direction under the force of gravity. Additionally, powder distribution module 150 further includes a valve 170 which is movably mounted over discharge orifice 164 for regulating the flow of additive powder 132.

Powder distribution module 150 may further include an actuator 180 which is operably coupled to valve 170 to move valve 170 between the open and closed position for selectively dispensing or regulating a flow of additive powder 132. As used herein, "actuator" is intended to refer to any device or mechanism suitable for moving valve 170 between an open or closed position or otherwise regulating the flow of additive powder 132 through discharge orifice 164. For example, it is contemplated that the actuator 180 is a pneumatic actuator which may be operated by regulating the flow of pressurized air from an air supply source. According to other exemplary embodiments, it is contemplated that the actuator 180 is a piezoelectric actuator that permits precise positioning of valve 170 in response to an electrical input. Other suitable actuators 180 are also contemplated and within the scope of the present subject matter, such as linear actuators, hydraulic actuators, electric motor actuators, etc.

Figure 7:
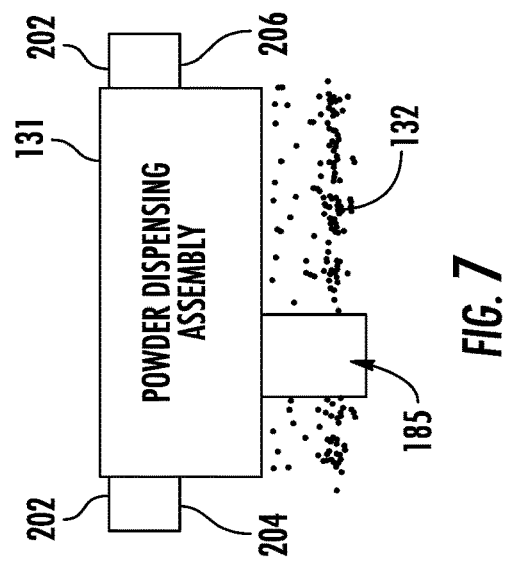
FIG. 7 schematically depicts an exemplary additive manufacturing system having a dosing rate measurement device in accordance with another exemplary embodiment of the present disclosure.
Figure 6:
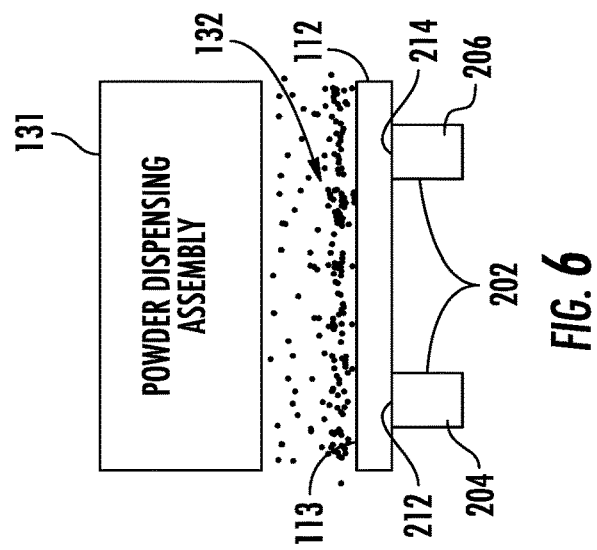
FIG. 6 schematically depicts an exemplary additive manufacturing system having a dosing rate measurement device in accordance with another exemplary embodiment of the present disclosure.
Figure 5:
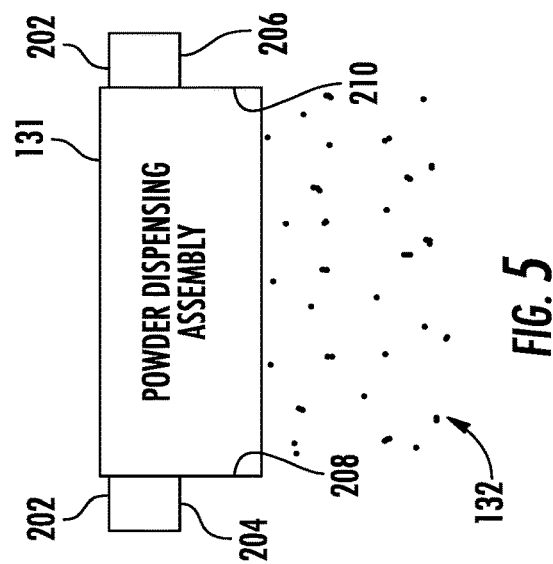
FIG. 5 schematically depicts an exemplary additive manufacturing system having a dosing rate measurement device in accordance with an exemplary embodiment of the present disclosure.

Referring now to FIGS. 5-7, exemplary embodiments and methods for an additive manufacturing machine 102 with a dosing rate measurement device 202 that measures a dosing rate of the additive powder 132 are illustrated.

Referring to FIGS. 2 and 5, in an exemplary embodiment of the present disclosure, an additive manufacture machine 102 of the present disclosure includes the mobile build unit 110, the unit-positioning system 124, and a dosing rate measurement device 202. The dosing rate measurement device 202 is in communication with a portion of the powder dispenser assembly 131 and the dosing rate measurement device 202 measures a dosing rate of the additive powder in-situ.

As used herein, "in-situ" is intended to refer to the dosing rate measurement device 202 being able to measure a dosing rate of the additive powder 132 while the additive manufacturing machine is operating. In-situ measurement of a dosing rate of the additive powder 132 of the present disclosure allows for monitoring of how a dosing rate is changing during operation of an additive manufacturing machine and reduces the instances of underdosing and overdosing.

As used herein, "dosing rate" is intended to refer to the rate that additive powder 132 is dosed to a work surface 113 of a build vessel 112 of an additive manufacture machine 102. Furthermore, "dosing rate" may refer to the amount of additive powder 132 that is dosed to a work surface 113 of a build vessel 112 of an additive manufacture machine 102.

It is contemplated that an additive manufacture machine 102 of the present disclosure may include any numbers of dosing rate measurement devices 202 including a single dosing rate measurement device 202 or two or more dosing rate measurement devices 202.

It is also contemplated that an additive manufacture machine 102 of the present disclosure may include one or more dosing rate measurement devices 202 on various portions of the additive manufacture machine 102. For example, a dosing rate measurement device 202 may be located on portions of the powder dispenser assembly 131, portions of the build vessel 112, and/or any other portions of the additive manufacture machine 102.

Referring to FIG. 5, in an exemplary embodiment of the present disclosure, the dosing rate measurement device 202 includes first dosing rate measurement device 204 and a second dosing rate measurement device 206. For example, the first dosing rate measurement device 204 is located on a first portion 208 of the powder dispenser assembly 131 and is configured to measure a weight of the additive powder 132 within the powder reservoir 142 (FIG. 2) to determine a dosing rate of the additive powder 132 in-situ. Furthermore, the second dosing rate measurement device 206 is located on a second portion 210 of the powder dispenser assembly 131 and is configured to measure the weight of the additive powder 132 within the powder reservoir 142 (FIG. 2) to determine a dosing rate of the additive powder 132 in-situ. In such exemplary embodiments, it is contemplated that the dosing rate measurement devices 202 can be located on any portion of the powder dispenser assembly 131.

Referring to FIG. 5, in exemplary embodiments, the first dosing rate measurement device 204 and the second dosing rate measurement device 206 comprise a first load cell and a second load cell, respectively. However, it is contemplated that any sensor, weight sensor, or other element may be used to measure the weight of the additive powder 132 within the powder reservoir 142 (FIG. 2) to determine a dosing rate of the additive powder 132 in-situ.

For example, in another exemplary embodiment, the first dosing rate measurement device 204 and the second dosing rate measurement device 206 can be level sensors located on respective first and second portions 208, 210 of the powder dispenser assembly 131. In this manner, the level sensors are configured to detect a level of the additive powder 132 within the powder reservoir 142 to determine a dosing rate of the additive powder 132 in-situ.

It is also contemplated that, in other exemplary embodiments, the first dosing rate measurement device 204 can be a load cell configured to measure the weight of the additive powder 132 within the powder reservoir 142 and the second dosing rate measurement device 206 can be a level sensor configured to detect a level of the additive powder 132 within the powder reservoir 142.

Referring to FIG. 6, in another exemplary embodiment of the present disclosure, the dosing rate measurement device 202 includes first dosing rate measurement device 204 and a second dosing rate measurement device 206. For example, the first dosing rate measurement device 204 is located on a first portion 212 of the build vessel 112 and is configured to measure a weight of the additive powder 132 dispensed to the work surface 113 to determine a dosing rate of the additive powder 132 in-situ. Furthermore, the second dosing rate measurement device 206 is located on a second portion 214 of the build vessel 112 and is configured to measure the weight of the additive powder 132 dispensed to the work surface 113 to determine a dosing rate of the additive powder 132 in-situ. In such exemplary embodiments, it is contemplated that the dosing rate measurement devices 202 can be located on any portion of the build vessel 112.

Referring to FIG. 6, in exemplary embodiments, the first dosing rate measurement device 204 and the second dosing rate measurement device 206 comprise a first load cell and a second load cell, respectively. However, it is contemplated that any sensor, weight sensor, or other element may be used to measure the weight of the additive powder 132 dispensed to the work surface 113 to determine a dosing rate of the additive powder 132 in-situ.

In exemplary embodiments, the dosing rate measurement device 202 measures the dosing rate of the additive powder 132 in-situ every time a predetermined amount of a layer of the additive powder 132 within the powder reservoir 142 is reached. In other exemplary embodiments, the dosing rate measurement device 202 measures the dosing rate of the additive powder 132 in-situ every time a predetermined amount of time is elapsed. It is also contemplated that the dosing rate measurement device 202 measures the dosing rate of the additive powder 132 in-situ using other predetermined variables associated with the operation of an additive manufacturing machine 102.

Referring to FIG. 7, in another exemplary embodiment of the present disclosure, another advantage of the dosing rate measurement device 202 measuring a dosing rate of the additive powder 132 in-situ will now be described. In such an embodiment, if the dosing rate measurement device 202 measures a dosing rate of the additive powder 132 that is not within a predetermined range of acceptable dosing rates, then a control system 104 of the present disclosure can provide indication, e.g., an error message, of a malfunction in a potentially clogged gate 185 of the powder dispenser assembly 131.

In another exemplary embodiment of the present disclosure, an additive manufacturing machine 102 also includes a control system 104 that can include one or more devices, such as sensors, controllers, processors, memory devices, controllable devices, electric machines, etc. that can monitor and control various aspects of an additive manufacturing machine 102. Particularly, the dosing rate of the additive powder 132 can be controlled and adjusted to make sure an appropriate and consistent amount of additive powder 132 is being dispensed to the work surface 113 for each layer of a build.

For instance, a computing system (e.g., controller 1100 shown in FIG. 8) can receive a measurement of the dosing rate of the additive powder 132 taken by the dosing rate measurement device 202, and in response to the measurement of the dosing rate, adjust the dosing rate of the additive powder 132 as described herein. In this way, the control system 104 of the present disclosure controls and adjusts the dosing rate of the additive powder 132 to make sure an appropriate and consistent amount of additive powder 132 is being dispensed to the work surface 113 for each layer of a build.

Figure 8:
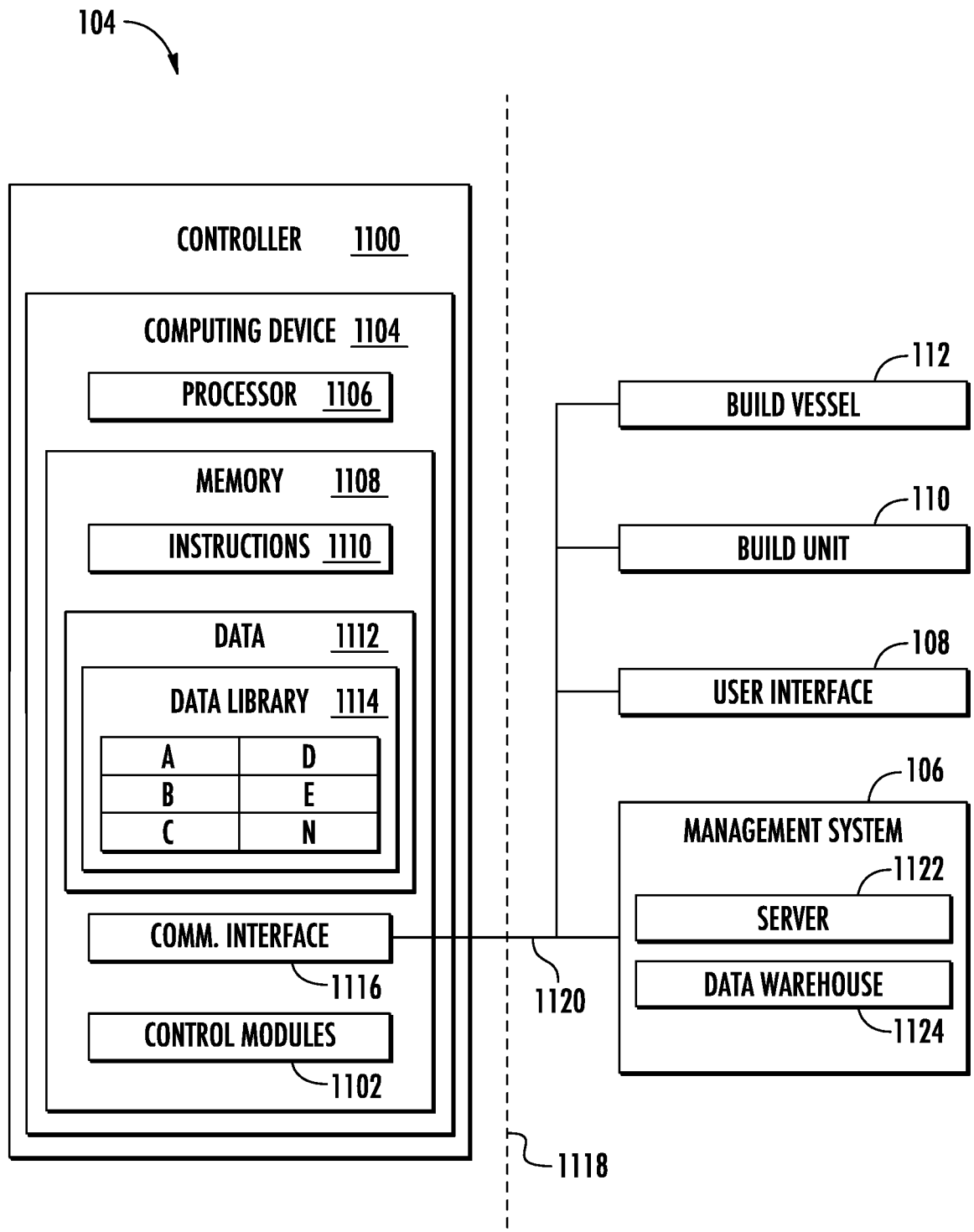
FIG. 8 schematically depicts an exemplary control system for an additive manufacturing machine or system in accordance with an exemplary embodiment of the present disclosure.

Referring now to FIG. 8, an exemplary control system for an additive manufacturing machine 102 or additive manufacturing system 100 will be described. A control system 104 may be configured to perform one or more control operations. A control system 104 may be configured to output one or more control commands associated with an additive manufacturing machine 102. The control commands may be configured to control one or more controllable components of an additive manufacturing machine 102.

As shown in FIG. 8 an exemplary control system 104 includes a controller or controllable device 1100. The controller may include one or more control modules 1102 configured to cause the controller 1100 to perform one or more control operations. The one or more control modules 1102 may include control logic executable to determine one or more operating parameters for an additive manufacturing machine 102, such as causing a controllable device to adjust the dosing rate of the additive powder 132 based on the dosing rate measured by a dosing rate measurement device 202, for example, for performing operations in accordance with the present disclosure. Additionally, or in the alternative, the one or more control modules 1102 may include control logic executable to provide control commands configured to control one or more controllable components associated with an additive manufacturing machine 102, such as controllable components associated with measuring a dosing rate of the additive powder 132 in-situ and adjusting the dosing rate of the additive powder 132 based on the dosing rate measured by a dosing rate measurement device 202. For example, a control module 1102 may be configured to provide one or more control commands based at least in part on one or more dosing rates of the additive powder 132 measured by a dosing rate measurement device 202 in accordance the present disclosure.

The controller 1100 may be communicatively coupled with an additive manufacturing machine 102. The controller 1100 may be communicatively coupled with one or more components of an additive manufacturing machine 102, such as one or more components of a build unit 110, a build vessel 112, a powder dispensing assembly 131, or other components of the additive manufacturing machine 102. The controller 1100 may also be communicatively coupled with a management system 106 and/or a user interface 108.

The controller 1100 may include one or more computing devices 1104, which may be located locally or remotely relative to the additive manufacturing machine 102. The one or more computing devices 1104 may include one or more processors 1106 and one or more memory devices 1108. The one or more processors 1106 may include any suitable processing device, such as a microprocessor, microcontroller, integrated circuit, logic device, and/or other suitable processing device. The one or more memory devices 1108 may include one or more computer-readable media, including but not limited to non-transitory computer-readable media, RAM, ROM, hard drives, flash drives, and/or other memory devices 1108.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1108 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1108 may store information accessible by the one or more processors 1106, including computer-executable instructions 1110, e.g., programs, that can be executed by the one or more processors 1106. The instructions 1110 may include any set of instructions which when executed by the one or more processors 1106 cause the one or more processors 1106 to perform operations, including optical element monitoring operations, maintenance operations, cleaning operations, calibration operations, and/or additive manufacturing operations.

The memory devices 1108 may store data 1112 accessible by the one or more processors 1106. The data 1112 can include current or real-time data 1112, past data 1112, or a combination thereof. The data 1112 may be stored in a data library 1114. As examples, the data 1112 may include data 1112 associated with or generated by an additive manufacturing system 100 and/or an additive manufacturing machine 102, including data 1112 associated with or generated by the controller 1100, an additive manufacturing machine 102, a build unit 110, a build vessel 112, a powder dispensing assembly 131, or other components of the additive manufacturing machine 102, a management system 106, a user interface 108, and/or a computing device 1104. Such data 1112 may pertain to operation of one or more build units 110. The data 1112 may also include other data sets, parameters, outputs, information, associated with an additive manufacturing system 100 and/or an additive manufacturing machine 102.

The one or more computing devices 1104 may also include a communication interface 1116, which may be used for communications with a communication network 1118 via wired or wireless communication lines 1120. The communication interface 1116 may include any suitable components for interfacing with one or more network(s), including for example, transmitters, receivers, ports, controllers, antennas, and/or other suitable components. The communication interface 1116 may allow the computing device 1104 to communicate with various nodes on the communication network 1118, such as nodes associated with the additive manufacturing machine 102, one or more build units 110, one or more build vessels 112, one or more powder dispensing assemblies 131, or other components of the additive manufacturing machine 102, the management system 106, and/or a user interface 108. The communication network 1118 may include, for example, a local area network (LAN), a wide area network (WAN), SATCOM network, VHF network, a HF network, a Wi-Fi network, a WiMAX network, a gatelink network, and/or any other suitable communication network 1118 for transmitting messages to and/or from the controller 1100 across the communication lines 1120. The communication lines 1120 of communication network 1118 may include a data bus or a combination of wired and/or wireless communication links.

The communication interface 1116 may allow the computing device 1104 to communicate with various components of an additive manufacturing system 100 and/or an additive manufacturing machine 102 communicatively coupled with the communication interface 1116 and/or communicatively coupled with one another, including one or more build units 110, one or more build vessels 112, one or more powder dispensing assemblies 131, or other components of the additive manufacturing machine 102. The communication interface 1116 may additionally or alternatively allow the computing device 1104 to communicate with the management system 106 and/or the user interface 108. The management system 106 may include a server 1122 and/or a data warehouse 1124. As an example, at least a portion of the data 1112 may be stored in the data warehouse 1124, and the server 1122 may be configured to transmit data 1112 from the data warehouse 1124 to the computing device 1104, and/or to receive data 1112 from the computing device 1104 and to store the received data 1112 in the data warehouse 1124 for further purposes. The server 1122 and/or the data warehouse 1124 may be implemented as part of a control system 104 and/or as part of the management system 106.

As described herein, the additive manufacturing machine 102 includes a computing system and a controllable device. Particularly, for this embodiment, the additive manufacturing machine 102 includes a computing system having one or more computing devices, including a controller 1100 configured to control the additive manufacturing machine 102, and in this embodiment, receive a measurement of the dosing rate of the additive powder 132 taken by the dosing rate measurement device 202 and, in response to the measurement of the dosing rate, adjust the dosing rate of the additive powder 132. The controller 1100 can include one or more processor(s) and associated memory device(s) configured to perform a variety of computer-implemented functions and/or instructions (e.g., performing the methods, steps, calculations and the like and storing relevant data as disclosed herein). The instructions, when executed by the one or more processors, can cause the one or more processor(s) to perform operations, such as adjusting the dosing rate of the additive powder 132 in response to the measurement of the dosing rate.

Additionally, the controller 1100 can include a communications module to facilitate communications between the controller 1100 and various components of the additive manufacturing machine 102. The communications module can include a sensor interface (e.g., one or more analog-to-digital converters) to permit signals transmitted from the one or more sensors to be converted into signals that can be understood and processed by the one or more processor(s). It should be appreciated that the sensors can be communicatively coupled to the communications module using any suitable means. For example, the sensors can be coupled to the sensor interface via a wired connection. However, in other embodiments, the sensors can be coupled to the sensor interface via a wireless connection, such as by using any suitable wireless communications protocol. As such, the processor(s) can be configured to receive one or more signals or outputs from the sensors, such as one or more operating conditions/parameters.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to complete the required computations needed to execute advanced algorithms. Additionally, the memory device(s) can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) can generally be configured to store suitable computer-readable instructions that, when implemented by the processor(s), configure the controllers 1100 to perform the various functions described herein. The controller 1100 can be configured in substantially the same manner as the exemplary computing device of the computing system described with reference to FIG. 8 herein (and may be configured to perform one or more of the functions of the exemplary method (400) described herein).

The controller 1100 may be a system of controllers or a single controller. The controller 1100 may be a controller dedicated to control of adjusting the dosing rate of the additive powder 132 in response to the measurement of the dosing rate by a dosing rate measurement device 202. For example, a controllable device of the present disclosure is operably coupled to the mobile build unit 110 and/or the powder dispensing assembly 131 and includes one or more processors configured to execute a program to cause the controllable device to adjust the dosing rate of the additive powder 132 based on the dosing rate measured by the dosing rate measurement device 202.

In an exemplary embodiment, a dosing rate measurement device 202 of the present disclosure measures a first dosing rate of the additive powder 132 in-situ, and the one or more processors 1106 are configured to execute a program to cause the controllable device 1100 to adjust the first dosing rate of the additive powder 132 based on the first dosing rate measured by the dosing rate measurement device 202. Furthermore, the dosing rate measurement device 202 measures a second dosing rate of the additive powder 132 in-situ, and the one or more processors 1106 are configured to execute the program to cause the controllable device 1100 to adjust the second dosing rate of the additive powder 132 based on the second dosing rate measured by the dosing rate measurement device 202. In this manner, a control system 104 of the present disclosure allows for adjustment of the amount of additive powder 132 dosed to a powder bed or work surface 113 of a build vessel 112 throughout an additive manufacturing process thereby keeping the dosing rate within a target range. This eliminates inconsistent dosing which can result in underdosing which fails builds and overdosing which increases the costs of builds.

In exemplary embodiments, the dosing rate measurement device 202 measures the dosing rate of the additive powder 132 in-situ every time a predetermined amount of a layer of the additive powder 132 within the powder reservoir 142 is reached. In other exemplary embodiments, the dosing rate measurement device 202 measures the dosing rate of the additive powder 132 in-situ every time a predetermined amount of time is elapsed. It is also contemplated that the dosing rate measurement device 202 measures the dosing rate of the additive powder 132 in-situ using other predetermined variables associated with the operation of an additive manufacturing machine 102.

In an exemplary embodiment of the present disclosure, the controller 1100 adjusts the dosing rate of the additive powder 132 based on the dosing rate measured by the dosing rate measurement device 202 by adjusting a speed that the mobile build unit 110 moves across the work surface 113. In this manner, if the dosing rate of the additive powder 132 is measured to be flowing fast, the controllable device 1100 speeds up the movement of the build unit 110 across the work surface 113 to make sure an appropriate and consistent amount of additive powder 132 is being dispensed to the work surface 113 for each layer of a build. Furthermore, if the dosing rate of the additive powder 132 is measured to be flowing slow, the controllable device 1100 slows down the movement of the build unit 110 across the work surface 113 to make sure an appropriate and consistent amount of additive powder 132 is being dispensed to the work surface 113 for each layer of a build.

In other exemplary embodiments, the controllable device 1100 adjusts the dosing rate of the additive powder 132 based on the dosing rate measured by the dosing rate measurement device 202 by varying a size of the discharge orifice 164.

As noted above, the control system 104 can include one or more devices, such as sensors, controllers, processors, memory devices, controllable devices, electric machines, etc. that can monitor and control various aspects of an additive manufacturing machine 102. Particularly, the dosing rate of the additive powder 132 can be controlled and adjusted to make sure an appropriate and consistent amount of additive powder 132 is being dispensed to the work surface 113 for each layer of a build.

For instance, a computing system (e.g., controller 1100) can receive a measurement of the dosing rate of the additive powder 132 taken by the dosing rate measurement device 202, and in response to the measurement of the dosing rate, adjust the dosing rate of the additive powder 132 as described herein. In this way, the control system 104 of the present disclosure controls and adjusts the dosing rate of the additive powder 132 to make sure an appropriate and consistent amount of additive powder 132 is being dispensed to the work surface 113 for each layer of a build.

Figure 9:
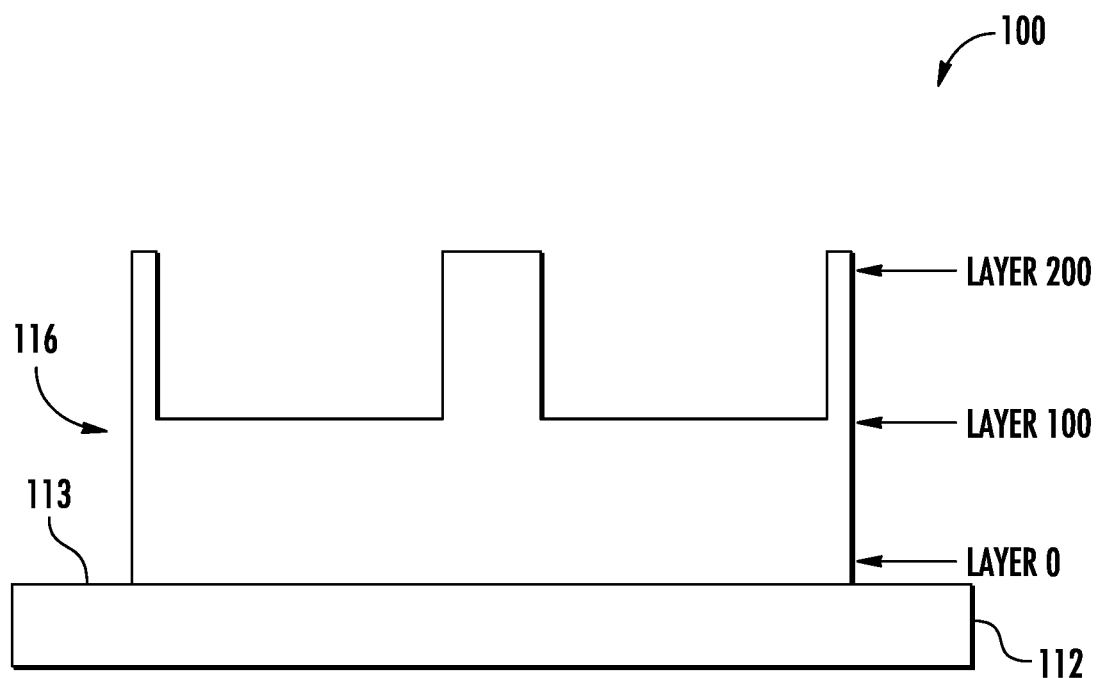
FIG. 9 schematically depicts an exemplary build object layer by layer in accordance with an exemplary embodiment of the present disclosure.

Referring to FIGS. 2 and 9, another advantage of a control system 104 of the present disclosure will now be described. The part geometry of an object 116 being additive manufactured influences how much additive powder 132 is required to be dosed per layer of the object 116. This is because as material is consolidated the density increases greater than the apparent density of the additive powder 132. For heavier cross-sections such as layer 0 to layer 100, more additive powder 132 will be consumed as it is consolidated compared to thinner cross-sections such as layer 100 to layer 200. The result is that more overall additive powder 132 is needed from layer 0 to layer 100, while less overall additive powder 132 is needed from layer 100 to layer 200. By understanding the part geometry of an object 116 and the current dosing rate by using the dosing rate measurement device 202 and the control system 104 of the present disclosure, such changes in additive powder per part layer can be programmed into the part and the additive manufacturing machine 102 can automatically change the recoat speed to vary the amount of additive powder 132 that is dropped per layer as the geometry changes in the vertical direction.

In this manner, the dosing rate measurement device 202 and the control system 104 of the present disclosure are able to make sure an appropriate and consistent amount of additive powder 132 is being dispensed to the work surface 113 for each layer of a build for specific objects 116 being built.

In another exemplary embodiment of the present disclosure, a powder dispensing assembly or powder dispensing system for an additive manufacturing machine includes a housing, a first plate removably connectable to the housing, and a second plate removably connectable to the housing. For example, the housing defines a powder reservoir that receives additive powder; the first plate defines a first discharge orifice having a first discharge orifice geometry; and the second plate defines a second discharge orifice having a second discharge orifice geometry different than the first discharge orifice geometry. In this manner, with the first plate connected to the housing, the additive powder flows out of the first discharge orifice at a first dosing rate; and with the second plate connected to the housing, the additive powder flows out of the second discharge orifice at a second dosing rate different than the first dosing rate. Such a powder dispensing system of the present disclosure provides a system that allows the dosing rate to be modifying.

In yet another exemplary embodiment of the present disclosure, a powder dispensing assembly or powder dispensing system for an additive manufacturing machine includes a housing and a plate removably connected to the housing. For example, the housing defines a powder reservoir that receives additive powder; and the plate defines a first discharge orifice having a first discharge orifice geometry and a second discharge orifice having a second discharge orifice geometry different than the first discharge orifice geometry. In this manner, the additive powder flows out of the first discharge orifice at a first dosing rate and the additive powder flows out of the second discharge orifice at a second dosing rate different than the first dosing rate. Such a powder dispensing assembly of the present disclosure provides a system that allows the dosing rate to be modifying.

Figure 12:
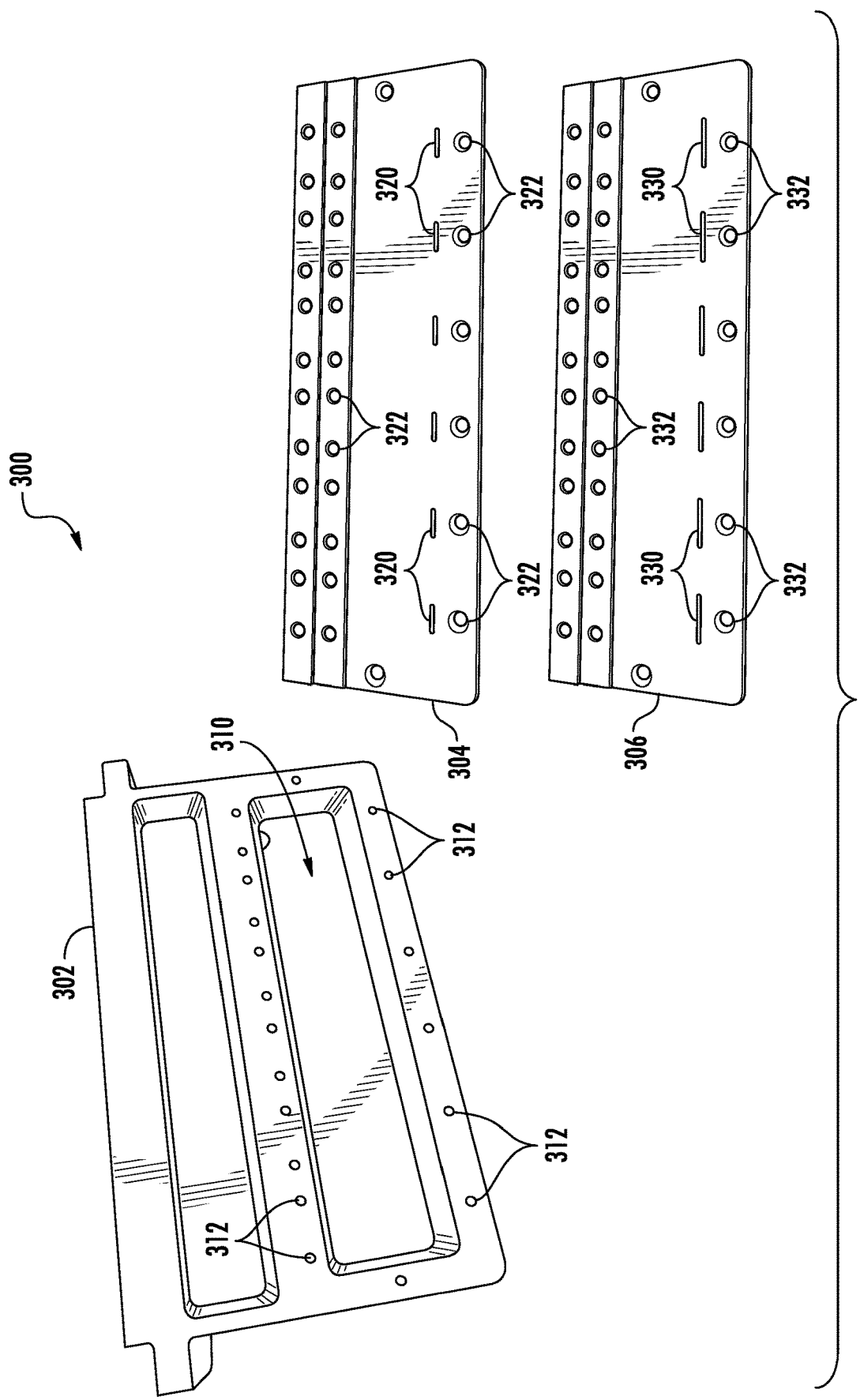
FIG. 12 is an exploded, perspective view of a powder dispensing system in accordance with an exemplary embodiment of the present disclosure.

FIGS. 12-15 illustrate additional exemplary embodiments of the present disclosure. Referring to FIG. 12, in an exemplary embodiment, a powder dispensing assembly or powder dispensing system 300 for an additive manufacturing machine 102 (FIGS. 1A-2) will now be described. The powder dispensing system 300 generally includes a housing 302 (e.g., a hopper body), a first plate 304 removably connectable to the housing 302, and a second plate 306 removably connectable to the housing 302. For example, the housing 302 defines a powder reservoir 310 that receives additive powder 132 (FIG. 2) and housing securement portions 312 spaced around the powder reservoir 310 that provide a removable connection with plates 304, 306 as described below.

Referring to FIG. 12, the first plate 304 defines a first discharge orifice 320 having a first discharge orifice geometry. As shown in FIG. 12, the first plate 304 defines a plurality of first discharge orifices 320 each having a first discharge orifice geometry. In other exemplary embodiments, each of the first discharge orifices 320 may have different geometries as described in detail below with reference to FIG. 13. The first plate 304 includes first plate securement portions 322 spaced around the first discharge orifices 320 that provide a removable connection with housing 302. For example, with respective first plate securement portions 322 aligned with housing securement portions 312, a connection member 314 (FIG. 13) can be used to securely connect the first plate 304 to the housing 302. In this manner, first plate 304 can be removably connected to housing 302. It is contemplated that connection member 314 can include any type of securement mechanism, such as fasteners, threaded fasteners, bolts, or any other connection component that allows for first plate 304 to be removably connected to housing 302.

Referring still to FIG. 12, the second plate 306 defines a second discharge orifice 330 having a second discharge orifice geometry different than the first discharge orifice geometry. As shown in FIG. 12, the second plate 306 defines a plurality of second discharge orifices 330 each having a second discharge orifice geometry. In other exemplary embodiments, each of the second discharge orifices 330 may have different geometries. The second plate 306 includes second plate securement portions 332 spaced around the second discharge orifices 330 that provide a removable connection with housing 302. For example, with respective second plate securement portions 332 aligned with housing securement portions 312, a connection member 314 (FIG. 13) can be used to securely connect the second plate 306 to the housing 302. In this manner, second plate 306 can be removably connected to housing 302. It is contemplated that connection member 314 can include any type of securement mechanism, such as fasteners, threaded fasteners, bolts, or any other connection component that allows for second plate 306 to be removably connected to housing 302.

In this manner, with the first plate 304 connected to the housing 302, the additive powder 132 (FIG. 2) flows out of the first discharge orifice 320 at a first dosing rate; and with the second plate 306 connected to the housing 302, the additive powder 132 (FIG. 2) flows out of the second discharge orifice 330 at a second dosing rate different than the first dosing rate. Such a powder dispensing system 300 of the present disclosure provides a system that allows the dosing rate to be modifying.

As discussed above, the first plate 304 defines a plurality of first discharge orifices 320 each having a first discharge orifice geometry and the second plate 306 defines a second discharge orifice 330 having a second discharge orifice geometry different than the first discharge orifice geometry.

The first discharge orifice geometry of the first discharge orifices 320 and the second discharge orifice geometry of the second discharge orifices 330 can include varying sizes, widths, heights, angles, surface roughness, configurations, or any other varying geometries to allow additive powder 132 (FIG. 2) to flow out of the discharge orifices 320, 330 at varying dosing rates. Furthermore, it is contemplated that the general geometry of the first discharge orifices 320 and the second discharge orifices 330 can include any geometrical shape such as oval, rectangular, circular, etc. Additionally, it is contemplated that the general geometry of a flowpath defined by the first discharge orifices 320 and the second discharge orifices 330 can include angled, straight, curved, smooth, rough, etc.

Figure 13:
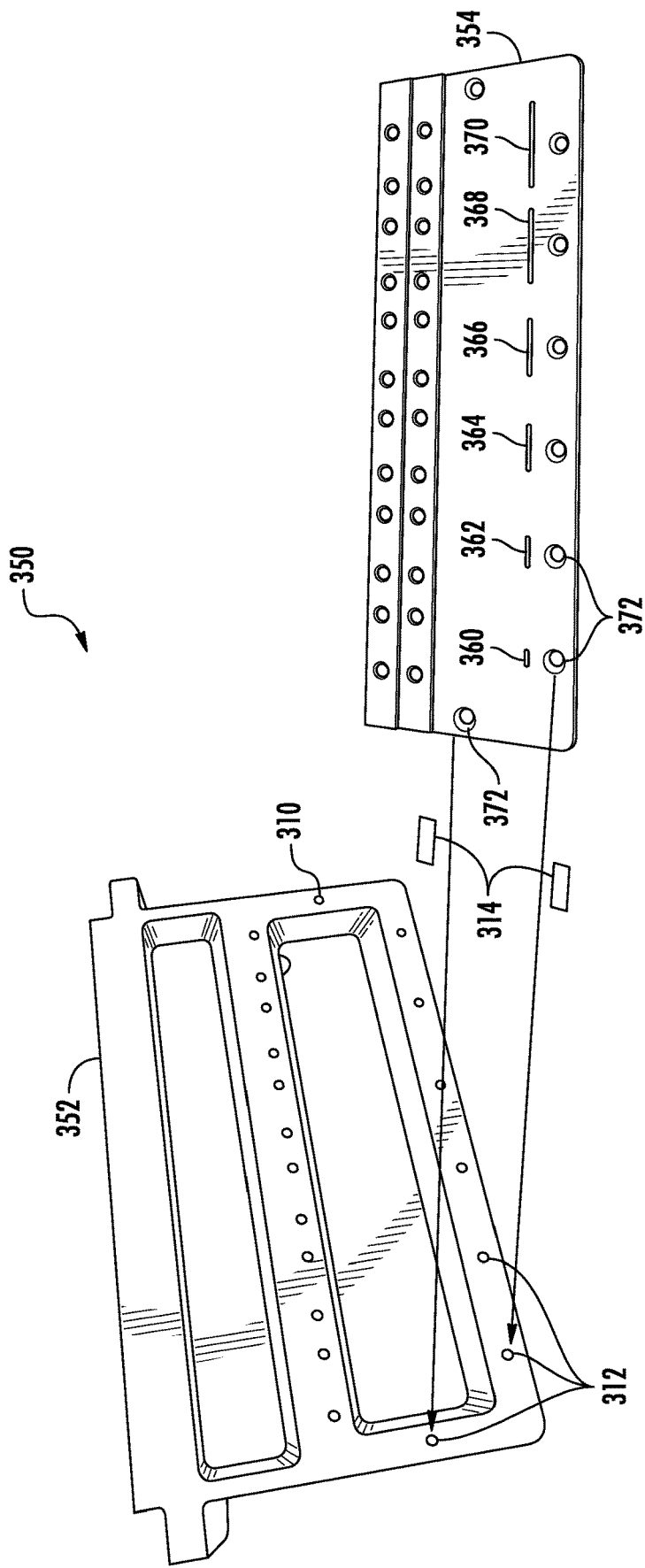
FIG. 13 is an exploded, perspective view of a powder dispensing system in accordance with another exemplary embodiment of the present disclosure.

Referring to FIG. 13, in another exemplary embodiment, a powder dispensing assembly or powder dispensing system 350 for an additive manufacturing machine 102 (FIGS. 1A-2) will now be described. The powder dispensing system 350 generally includes a housing 352 (e.g., a hopper body) and a plate or first plate 354 removably connectable to the housing 352. For example, the housing 352 defines a powder reservoir 310 that receives additive powder 132 (FIG. 2) and housing securement portions 312 spaced around the powder reservoir 310 that provide a removable connection with plate 354 as described herein. Referring to FIGS. 12 and 13, second plate 306 is also compatible with the system 350 shown in FIG. 13.

Referring to FIG. 13, the plate 354 defines a first discharge orifice 360 having a first discharge orifice geometry and a second discharge orifice 362 having a second discharge orifice geometry different than the first discharge orifice geometry. In this manner, additive powder 132 (FIG. 2) flows out of the first discharge orifice 360 at a first dosing rate and additive powder 132 (FIG. 2) flows out of the second discharge orifice 362 at a second dosing rate different than the first dosing rate.

The plate 354 includes plate securement portions 372 spaced around the discharge orifices that provide a removable connection with housing 352. For example, with respective plate securement portions 372 aligned with housing securement portions 312, a connection member 314 (FIG. 13) can be used to securely connect the plate 354 to the housing 352. In this manner, plate 354 can be removably connected to housing 352. It is contemplated that connection member 314 can include any type of securement mechanism, such as fasteners, threaded fasteners, bolts, or any other connection component that allows for plate 354 to be removably connected to housing 352.

Furthermore, as shown in FIG. 13, in an exemplary embodiment, the plate 354 defines a plurality of discharge orifices each having a different discharge orifice geometry. For example, the plate 354 defines a first discharge orifice 360, a second discharge orifice 362, a third discharge orifice 364, a fourth discharge orifice 366, a fifth discharge orifice 368, and a sixth discharge orifice 370. In one embodiment, the first discharge orifice 360 has a width of 4 mm, the second discharge orifice 362 has a width of 8 mm, a third discharge orifice 364 has a width of 12 mm, a fourth discharge orifice 366 has a width of 16 mm, a fifth discharge orifice 368 has a width of 20 mm, and a sixth discharge orifice 370 has a width of 24 mm. In this manner, additive powder 132 (FIG. 2) flows out of each of the discharge orifices at a different dosing rate.

Figure 14:
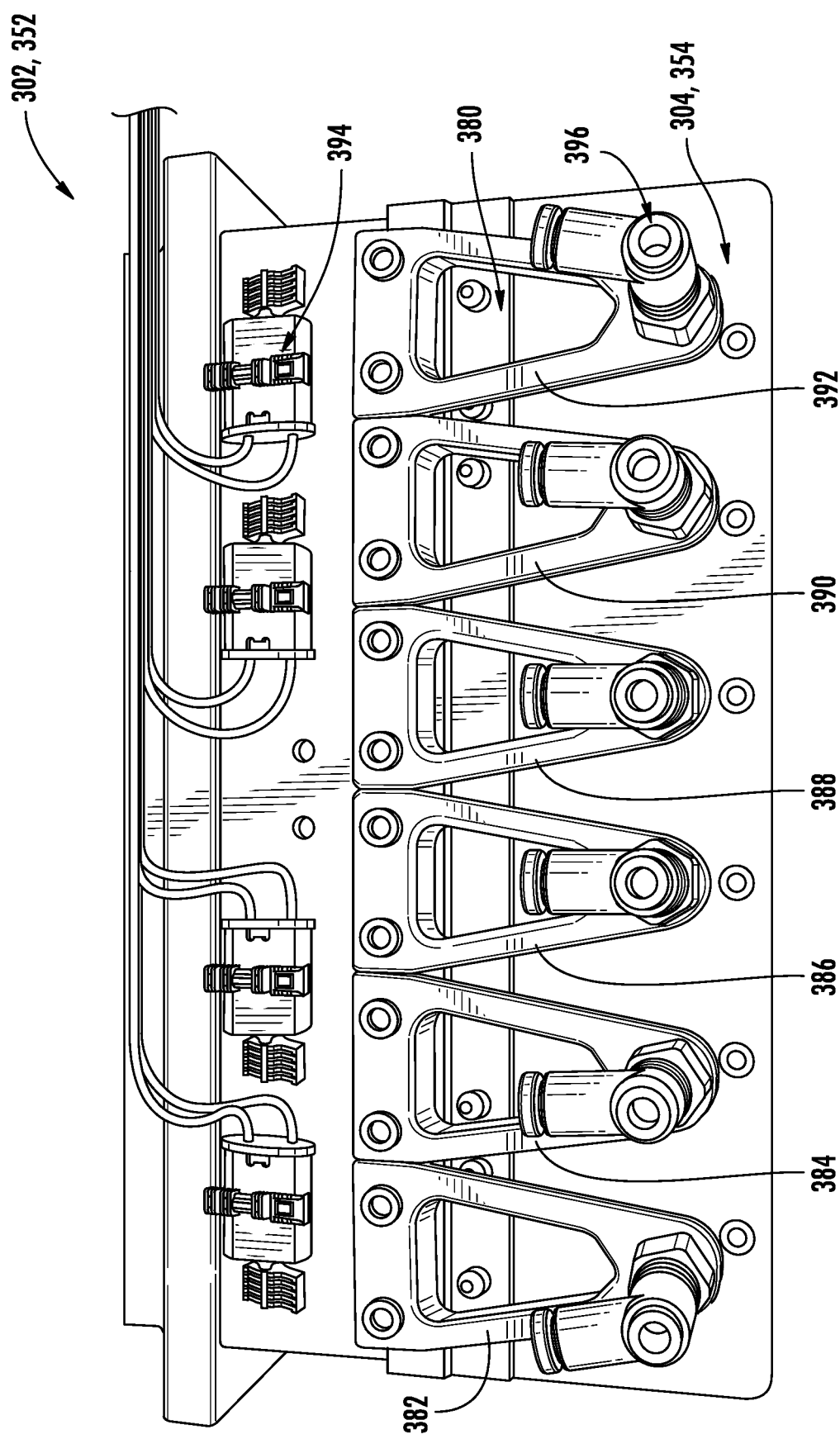
FIG. 14 is a perspective view of a housing of a powder dispensing system in accordance with an exemplary embodiment of the present disclosure.

Referring to FIGS. 12-14, in exemplary embodiments, a powder dispensing assembly or powder dispensing system 300, 350 for an additive manufacturing machine 102 (FIGS. 1A-2) also includes a gate system 380 that is transitionable between an open position in which additive powder 132 (FIG. 2) flows through a discharge orifice and a closed position in which the discharge orifice is closed. In this manner, the gate system 380 is used to open and close a discharge orifice of the present disclosure to control flow of additive powder 132 (FIG. 2) through the discharge orifice.

In an exemplary embodiment, the gate system 380 includes a first gate 382, a second gate 384, a third gate 386, a fourth gate 388, a fifth gate 390, and a sixth gate 392 that are in communication with the first discharge orifice 360, the second discharge orifice 362, the third discharge orifice 364, the fourth discharge orifice 366, the fifth discharge orifice 368, and the sixth discharge orifice 370, respectively. In this manner each of the gates 382, 384, 386, 388, 390, 392 respectively control flow through each of the discharge orifices 360, 362, 364, 366, 368, 370. For example, the first gate 382 is in communication with the first discharge orifice 360 and the first gate 382 is transitionable between a first open position in which the additive powder 132 (FIG. 2) flows through the first discharge orifice 360 and a first closed position in which the first discharge orifice 360 is closed and no additive powder 132 (FIG. 2) flows through. Similarly, the second gate 384 is in communication with the second discharge orifice 362 and the second gate 384 is transitionable between a second open position in which the additive powder 132 (FIG. 2) flows through the second discharge orifice 362 and a second closed position in which the second discharge orifice 362 is closed and no additive powder 132 (FIG. 2) flows through. In this manner, the other gates 386, 388, 390, 392 respectively control flow through each of the discharge orifices 364, 366, 368, 370.

Furthermore, the powder dispensing systems 300, 350 shown in FIGS. 12-14 are compatible with the dosing rate measurement device 202 (FIGS. 5-7) and the control system 104 (FIG. 8). For example, a position of the gates 382, 384, 386, 388, 390, 392 are controlled by the controllable device or controller 1100 of control system 104 (FIG. 8).

Referring to FIG. 14, the housing 302, 352 also includes a motor 394 for vibrating or agitating additive powder 132 (FIG. 2) and pneumatic pins 396 that are used in communication with respective gates 382, 384, 386, 388, 390, 392 to control the dosing rate of the additive powder 132.

Figure 10:
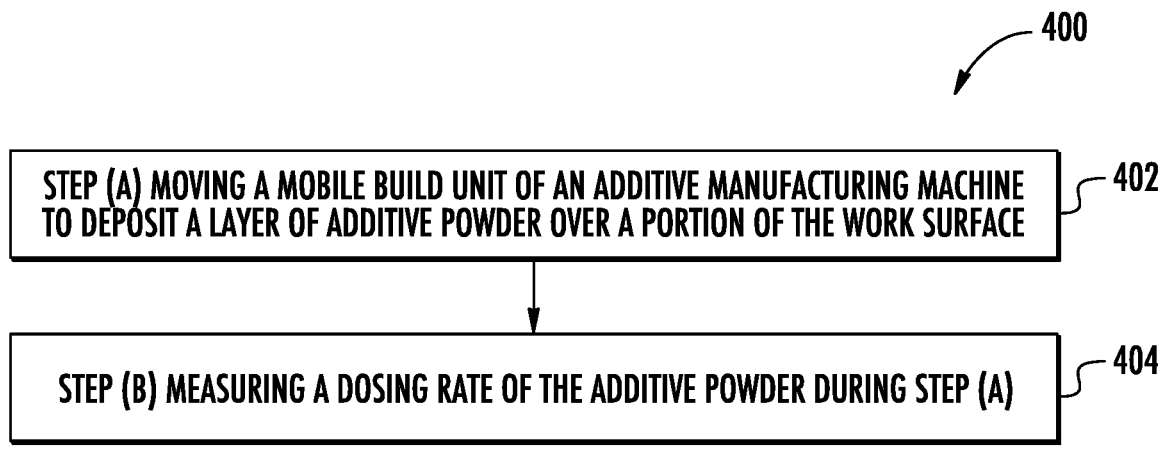
FIG. 10 is a flow diagram of a method of additively manufacturing a three-dimensional object on a work surface in accordance with an exemplary aspect of the present disclosure.
Figure 11:
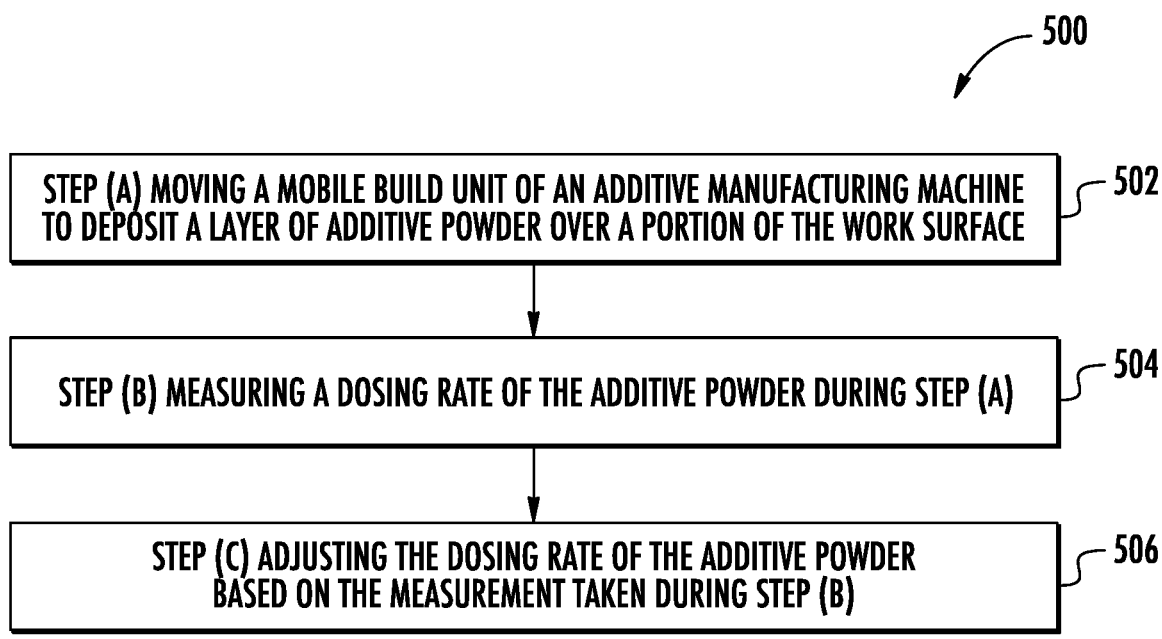
FIG. 11 is a flow diagram of a method of additively manufacturing a three-dimensional object on a work surface in accordance with another exemplary aspect of the present disclosure.
Figure 15:
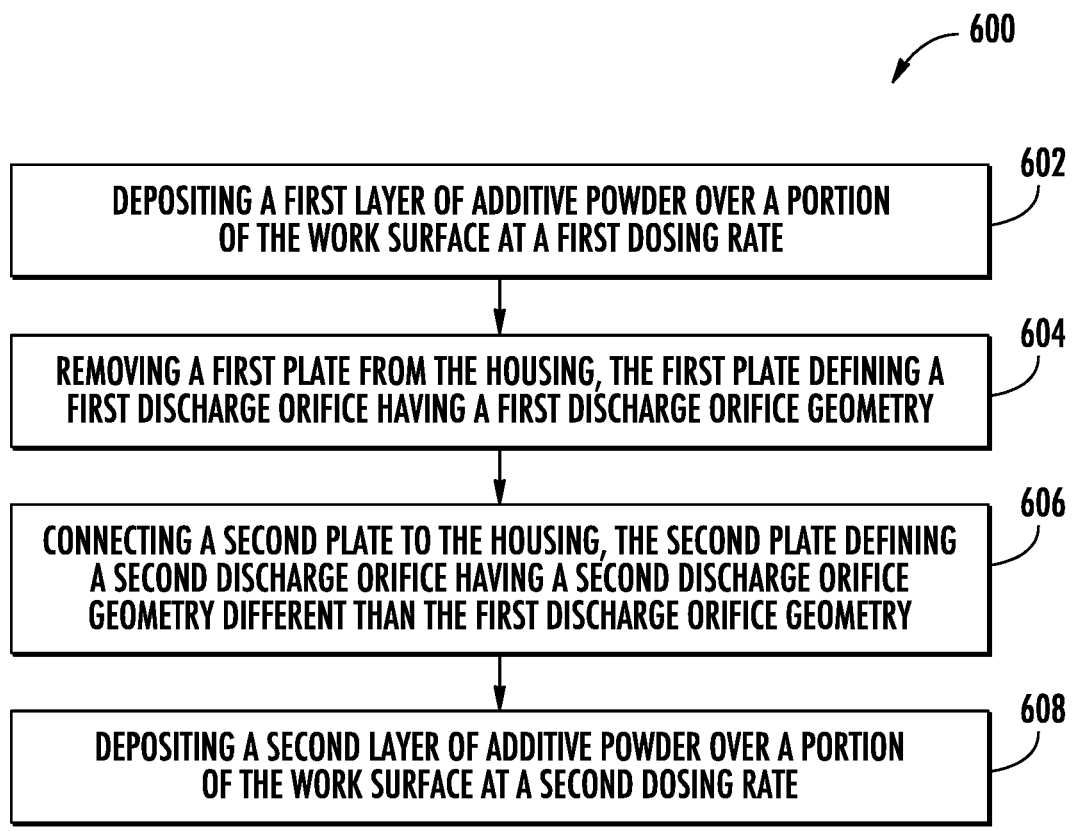
FIG. 15 is a flow diagram of a method of additively manufacturing a three-dimensional object on a work surface in accordance with another exemplary aspect of the present disclosure.

Referring now to FIGS. 10, 11, and 15, exemplary aspects of the present disclosure will now be discussed.

For the exemplary aspect of FIG. 10, the method 400 generally includes at (402) moving a mobile build unit of an additive manufacturing machine to deposit a layer of additive powder over a portion of the work surface as described in detail above with reference to FIGS. 1 through 7. The method 400 further includes at (404) measuring a dosing rate of the additive powder during step (402) as described in detail above with reference to FIGS. 1 through 7.

For the exemplary aspect of FIG. 11, the method 500 generally includes at (502) moving a mobile build unit of an additive manufacturing machine to deposit a layer of additive powder over a portion of the work surface as described in detail above with reference to FIGS. 1 through 8. The method 500 further includes at (504) measuring a dosing rate of the additive powder during step (502) as described in detail above with reference to FIGS. 1 through 8. Furthermore, the method includes at (506) adjusting the dosing rate of the additive powder based on the measurement taken during step (504) as described in detail above with reference to FIGS. 1 through 8.

For the exemplary aspect of FIG. 15, the method 600 generally includes at (602) depositing a first layer of additive powder over a portion of the work surface at a first dosing rate as described in detail above with reference to FIGS. 1 through 14. The method 600 further includes at (604) removing a first plate from the housing, the first plate defining a first discharge orifice having a first discharge orifice geometry, as described in detail above with reference to FIGS. 12 through 14.

Furthermore, the method includes at (606) connecting a second plate to the housing, the second plate defining a second discharge orifice having a second discharge orifice geometry different than the first discharge orifice geometry, as described in detail above with reference to FIGS. 12 through 14. The method 600 further includes at (608) depositing a second layer of additive powder over a portion of the work surface at a second dosing rate as described in detail above with reference to FIGS. 1 through 14.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects of the presently disclosed subject matter are provided by the following clauses:

1. A powder dispensing assembly for an additive manufacturing machine, the powder dispensing assembly comprising: a housing that defines a powder reservoir that receives additive powder; a first plate removably connectable to the housing, the first plate defining a first discharge orifice having a first discharge orifice geometry; and a second plate removably connectable to the housing, the second plate defining a second discharge orifice having a second discharge orifice geometry different than the first discharge orifice geometry, wherein with the first plate connected to the housing, the additive powder flows out of the first discharge orifice at a first dosing rate, and wherein with the second plate connected to the housing, the additive powder flows out of the second discharge orifice at a second dosing rate different than the first dosing rate.

2. The powder dispensing assembly of any preceding clause, wherein a width of the first discharge orifice is different than a width of the second discharge orifice.

3. The powder dispensing assembly of any preceding clause, wherein the first plate is connected to the housing via a securement mechanism.

4. The powder dispensing assembly of any preceding clause, wherein the securement mechanism comprises a bolt connection.

5. The powder dispensing assembly of any preceding clause, wherein the housing of the powder dispensing assembly is part of a build unit of the additive manufacturing machine, and wherein the additive manufacturing machine includes a build vessel defining a work surface.

6. The powder dispensing assembly of any preceding clause, further comprising a positioning system adapted to provide independent movement of at least one of the build unit and the work surface with respect to one another in at least two dimensions.

7. A powder dispensing assembly for an additive manufacturing machine, the powder dispensing assembly comprising: a housing that defines a powder reservoir that receives additive powder; and a first plate removably connected to the housing, the first plate defining a first discharge orifice having a first discharge orifice geometry and a second discharge orifice having a second discharge orifice geometry different than the first discharge orifice geometry, wherein the additive powder flows out of the first discharge orifice at a first dosing rate and the additive powder flows out of the second discharge orifice at a second dosing rate different than the first dosing rate.

8. The powder dispensing assembly of any preceding clause, further comprising a first gate in communication with the first discharge orifice, the first gate transitionable between a first open position in which the additive powder flows through the first discharge orifice and a first closed position in which the first discharge orifice is closed; and a second gate in communication with the second discharge orifice, the second gate transitionable between a second open position in which the additive powder flows through the second discharge orifice and a second closed position in which the second discharge orifice is closed.

9. The powder dispensing assembly of any preceding clause, further comprising a dosing rate measurement device in communication with the powder dispenser assembly, wherein the dosing rate measurement device measures a dosing rate of the additive powder in-situ.

10. The powder dispensing assembly of any preceding clause, wherein the housing of the powder dispensing assembly is part of a build unit of the additive manufacturing machine, and wherein the additive manufacturing machine includes a build vessel defining a work surface, and the additive manufacturing machine further comprises a positioning system adapted to provide independent movement of at least one of the build unit and the work surface with respect to one another in at least two dimensions.

11. The powder dispensing assembly of any preceding clause, further comprising a controllable device operably coupled to the build unit and including one or more processors configured to execute a program to cause the controllable device to adjust the dosing rate of the additive powder based on the dosing rate measured by the dosing rate measurement device.

12. The powder dispensing assembly of any preceding clause, wherein a position of the first gate is controlled by the controllable device.

13. The powder dispensing assembly of any preceding clause, wherein a position of the second gate is independently controlled by the controllable device.

14. The powder dispensing assembly of any preceding clause, further comprising a second plate removably connectable to the housing, the second plate defining a third discharge orifice having a third discharge orifice geometry, wherein with the second plate connected to the housing, the additive powder flows out of the third discharge orifice at a third dosing rate different than the first dosing rate.

15. The powder dispensing assembly of any preceding clause, wherein a width of the first discharge orifice is different than a width of the second discharge orifice.

16. The powder dispensing assembly of any preceding clause, wherein the first plate is connected to the housing via a securement mechanism.

17. The powder dispensing assembly of any preceding clause, wherein the securement mechanism comprises a bolt connection.

18. A method of additively manufacturing a three-dimensional object on a work surface including a powder dispensing assembly having a housing, the method comprising: depositing a first layer of additive powder over a portion of the work surface at a first dosing rate; removing a first plate from the housing, the first plate defining a first discharge orifice having a first discharge orifice geometry; and connecting a second plate to the housing, the second plate defining a second discharge orifice having a second discharge orifice geometry different than the first discharge orifice geometry.

19. The method of any preceding clause, further comprising depositing a second layer of additive powder over a portion of the work surface at a second dosing rate.

20. The method of any preceding clause, wherein a width of the first discharge orifice is different than a width of the second discharge orifice.

This written description uses exemplary embodiments to describe the presently disposed subject matter, including the best mode, and also to enable any person skilled in the art to practice such subject matter, including making and using any devices or systems and performing any incorporated methods. The patentable scope of the presently disposed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A powder dispensing assembly for an additive manufacturing machine, the powder dispensing assembly comprising:
   a housing that defines a powder reservoir that receives additive powder;
   a first plate removably connectable to the housing, the first plate defining a first discharge orifice having a first discharge orifice geometry; and
   a second plate removably connectable to the housing, the second plate defining a second discharge orifice having a second discharge orifice geometry different than the first discharge orifice geometry,
   wherein with the first plate connected to the housing, the additive powder flows out of the first discharge orifice at a first dosing rate,
   wherein with the second plate connected to the housing, the additive powder flows out of the second discharge orifice at a second dosing rate different than the first dosing rate, and
   wherein the housing of the powder dispensing assembly is part of a build unit of the additive manufacturing machine, and wherein the additive manufacturing machine includes a build vessel defining a work surface.

2. The powder dispensing assembly of claim 1, wherein a width of the first discharge orifice is different than a width of the second discharge orifice.

3. The powder dispensing assembly of claim 1, wherein the first plate is connected to the housing via a securement mechanism.

4. The powder dispensing assembly of claim 3, wherein the securement mechanism comprises a bolt connection.

5. The powder dispensing assembly of claim 1, further comprising:
a positioning system adapted to provide independent movement of at least one of the build unit and the work surface with respect to one another in at least two dimensions.

6. A powder dispensing assembly for an additive manufacturing machine, the powder dispensing assembly comprising:
a housing that defines a powder reservoir that receives additive powder;
a first plate removably connected to the housing, the first plate defining a first discharge orifice having a first discharge orifice geometry and a second discharge orifice having a second discharge orifice geometry different than the first discharge orifice geometry;
a first gate in communication with the first discharge orifice, the first gate transitionable between a first open position in which the additive powder flows through the first discharge orifice and a first closed position in which the first discharge orifice is closed; and
a second gate in communication with the second discharge orifice, the second gate transitionable between a second open position in which the additive powder flows through the second discharge orifice and a second closed position in which the second discharge orifice is closed,
wherein the additive powder flows out of the first discharge orifice at a first dosing rate and the additive powder flows out of the second discharge orifice at a second dosing rate different than the first dosing rate.

7. The powder dispensing assembly of claim 6, further comprising:
a dosing rate measurement device in communication with the powder dispenser assembly, wherein the dosing rate measurement device measures a dosing rate of the additive powder in-situ.

8. The powder dispensing assembly of claim 7, wherein the housing of the powder dispensing assembly is part of a build unit of the additive manufacturing machine, and wherein the additive manufacturing machine includes a build vessel defining a work surface, and the additive manufacturing machine further comprises a positioning system adapted to provide independent movement of at least one of the build unit and the work surface with respect to one another in at least two dimensions.

9. The powder dispensing assembly of claim 8, further comprising:
a controllable device operably coupled to the build unit and including one or more processors configured to execute a program to cause the controllable device to adjust the dosing rate of the additive powder based on the dosing rate measured by the dosing rate measurement device.

10. The powder dispensing assembly of claim 9, wherein a position of the first gate is controlled by the controllable device.

11. The powder dispensing assembly of claim 9, wherein a position of the second gate is independently controlled by the controllable device.

12. The powder dispensing assembly of claim 6, further comprising:
a second plate removably connectable to the housing, the second plate defining a third discharge orifice having a third discharge orifice geometry,
wherein with the second plate connected to the housing, the additive powder flows out of the third discharge orifice at a third dosing rate different than the first dosing rate.

13. The powder dispensing assembly of claim 6, wherein a width of the first discharge orifice is different than a width of the second discharge orifice.

14. The powder dispensing assembly of claim 6, wherein the first plate is connected to the housing via a securement mechanism.

15. The powder dispensing assembly of claim 14, wherein the securement mechanism comprises a bolt connection.

16. A powder dispensing assembly for an additive manufacturing machine, the powder dispensing assembly comprising:
a housing that defines a powder reservoir that receives additive powder;
a first plate removably connected to the housing, the first plate defining a first discharge orifice having a first discharge orifice geometry and a second discharge orifice having a second discharge orifice geometry different than the first discharge orifice geometry; and
a second plate removably connectable to the housing, the second plate defining a third discharge orifice having a third discharge orifice geometry,
wherein the additive powder flows out of the first discharge orifice at a first dosing rate and the additive powder flows out of the second discharge orifice at a second dosing rate different than the first dosing rate, and
wherein with the second plate connected to the housing, the additive powder flows out of the third discharge orifice at a third dosing rate different than the first dosing rate.

* * * * *